United States Patent
Meriac et al.

(10) Patent No.: US 10,735,428 B2
(45) Date of Patent: *Aug. 4, 2020

(54) DATA ACCESS AND OWNERSHIP MANAGEMENT

(71) Applicants: ARM IP Limited, Cambridge (GB); ARM Limited, Cambridge (GB)

(72) Inventors: Milosch Meriac, Cambridge (GB); Geraint Luff, Cambridge (GB); William Allen Curtis, Austin, TX (US); Remy Pottier, Grenoble (FR)

(73) Assignees: ARM IP Limited, Cambridge (GB); ARM Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,796

(22) Filed: Oct. 2, 2018

(65) Prior Publication Data

US 2019/0036928 A1   Jan. 31, 2019

Related U.S. Application Data

(63) Continuation of application No. 14/832,428, filed on Aug. 21, 2015, now Pat. No. 10,122,718.

(51) Int. Cl.
*H04L 29/06* (2006.01)
*H04W 12/02* (2009.01)
*H04L 29/08* (2006.01)

(52) U.S. Cl.
CPC .......... *H04L 63/10* (2013.01); *H04L 63/0421* (2013.01); *H04L 67/02* (2013.01); *H04L 67/10* (2013.01); *H04W 12/02* (2013.01)

(58) Field of Classification Search
CPC .................................................. H04L 63/10
See application file for complete search history.

(56) References Cited

U.S. PATENT DOCUMENTS 6,085,242 A * 7/2000 Chandra .......... H04L 29/12009
709/223
9,338,164 B1   5/2016 Liu et al.
(Continued)

FOREIGN PATENT DOCUMENTS

EP         2456246 A1    5/2012
WO    WO0041092 A1    7/2000
(Continued)

OTHER PUBLICATIONS

International Search Report and Written Opinion from PCT Application Serial No. PCT/GB2016/052546, dated Oct. 20, 2016, 12 pages.
(Continued)

*Primary Examiner* — William S Powers
(74) *Attorney, Agent, or Firm* — Kinney & Lange, P.A.

(57) ABSTRACT

In one example, a method includes obtaining, by a data processing device, first secret data associated with a first user and corresponding to a first location of a remote resource. The method further includes generating, using the first secret data, a first uniform resource locator (URL) usable to obtain the first location, and accessing the first location using the first URL. The method further includes obtaining, in response to transfer of usage rights of the data processing device from the first user to a second user, second secret data associated with the second user and corresponding to a second location of the remote resource. The method further includes generating, using the second secret data, a second URL usable to obtain the second location, and accessing the second location using the second URL. The second location is inaccessible via the first URL. The first location is inaccessible via the second URL.

18 Claims, 13 Drawing Sheets

(56) References Cited

U.S. PATENT DOCUMENTS

| | | |
|---|---|---|
| 2006/0106802 A1 | 5/2006 | Giblin et al. |
| 2009/0193513 A1 | 7/2009 | Agarwal et al. |
| 2009/0222903 A1 | 9/2009 | Sherkin et al. |
| 2012/0124372 A1 | 5/2012 | Dilley et al. |
| 2012/0166803 A1 | 6/2012 | Hu et al. |
| 2013/0238979 A1 | 9/2013 | Sayers, III et al. |
| 2016/0248587 A1 | 8/2016 | Westberg et al. |

FOREIGN PATENT DOCUMENTS

| | | |
|---|---|---|
| WO | WO2012051452 A2 | 4/2012 |
| WO | WO2015122813 A1 | 8/2015 |

OTHER PUBLICATIONS

International Preliminary Report on Patentability for PCT Application No. PCT/GB2016/052546, dated Feb. 27, 2018, 8 pages.

* cited by examiner

```
                    Secret Data      ← 62
                       {
64  ──▶      "scope":"/data",
66  ──▶      "url": {
    68 ──▶      "secret": {"data": "a secret string", "encoding": "plain"},
    70 ──▶      "hmac": "SHA256",
    72 ──▶      "template": "/data/{hex:22}"
             },
74  ──▶      "content": {
    76 ──▶      "key":{
        78 ──▶      "data": "another secret string",
                    "encoding": "plain"
                },
        80 ──▶  "encryption": "AES192"
             },
             "keyExpansionUrl": https://...
       }
```

Fig. 8

DATA ACCESS AND OWNERSHIP MANAGEMENT

CROSS-REFERENCE TO RELATED APPLICATION(S)

This application is a continuation of U.S. patent application Ser. No. 14/832,428, entitled "DATA ACCESS AND OWNERSHIP MANAGEMENT," filed on Aug. 21, 2015, which is hereby incorporated by reference in its entirety.

BACKGROUND

The present disclosure relates generally to the field of data processing, and in particular to managing access to and ownership of data at a remote resource.

Many modern computing devices are enabled with so-called "smart" technologies that enable such devices to transmit and/or exchange data with other devices via wired or wireless communication networks, or both. An increasing number of these modern devices are configured to connect to and take advantage of services provided by various interconnected computing devices (e.g., servers), often referred to as the "cloud." For example, relatively small devices, such as temperature sensors, healthcare monitors, and electronic door locks can be connected to the cloud, e.g., as part of the "Internet of Things" (IoT). In this way, the connected devices can be accessed and controlled using remote devices, such as mobile phones, tablet computers, laptop computers, desktop computers, or other such devices. For instance, a door lock may be remotely opened from a remote platform (e.g., a smartphone), or data from a temperature sensor or healthcare monitor may be aggregated at a remote location (e.g., a server device) and accessed from another device, such as a laptop computer. As such, there is an increasing amount of data being collected by cloud platforms and the corresponding service providers.

At the same time, there is also an increasing concern among many users regarding the privacy and security of data collected by the cloud service providers. For instance, concerns that collected data, often viewed as personal in nature, can be accessed or even misused by the cloud service providers may discourage the use of connected (e.g., IoT) devices by concerned users, thereby impeding the proliferation of IoT devices and networks and the corresponding advantages that they provide. While such concerns can be addressed, in part, through data encryption techniques, standard encryption operations can impose logistical hurdles, such as when synchronizing or changing encryption keys. Moreover, privacy concerns can be aggravated by the possible shared use of the connected device between multiple users and/or the transfer of ownership or usage rights to the device between users.

SUMMARY

In one example, a method includes obtaining, by a data processing device comprising processing circuitry and computer-readable memory, first secret data associated with a first user and corresponding to a first location of a remote resource. The method further includes generating, by the data processing device using the first secret data, a first uniform resource locator (URL) usable to obtain the first location of the remote resource, and accessing, by the data processing device, the first location of the remote resource using the first URL. The method further includes obtaining, by the data processing device in response to a transfer of usage rights of the data processing device from the first user to a second user, second secret data associated with the second user and corresponding to a second location of the remote resource. The method further includes generating, by the data processing device using the second secret data, a second URL usable to obtain the second location of the remote resource, and accessing, by the data processing device, the second location of the remote resource using the second URL. The second location of the remote resource is inaccessible via the first URL. The first location of the remote resource is inaccessible via the second URL.

In another example, a data processing device includes processing circuitry, communications circuitry, and computer-readable memory. The computer-readable memory is encoded with instructions that, when executed by the processing circuitry, cause the data processing device to obtain, via the communications circuitry, first secret data associated with a first user and corresponding to a first location of a remote resource. The computer-readable memory is further encoded with instructions that, when executed by the processing circuitry, cause the data processing device to generate, using the first secret data, a first uniform resource locator (URL) usable to obtain the first location of the remote resource, and access, via the communications circuitry, the first location of the remote resource using the first URL. The computer-readable memory is further encoded with instructions that, when executed by the processing circuitry, cause the data processing device to obtain, via the communications circuitry in response to a transfer of usage rights of the data processing device from the first user to a second user, second secret data associated with the second user and corresponding to a second location of the remote resource. The computer-readable memory is further encoded with instructions that, when executed by the processing circuitry, cause the data processing device to generate, using the second secret data, a second URL usable to obtain the second location of the remote resource, and access, via the communications circuitry, the second location of the remote resource using the second URL. The second location of the remote resource is inaccessible via the first URL. The first location of the remote resource is inaccessible via the second URL.

In another example, a method includes generating, by a server system comprising at least one computing device and computer-readable memory, first secret data associated with a first user and corresponding to a first location of the computer-readable memory of the server system. The method further includes providing, by the server system to a data processing device, the first secret data for generating a first URL usable to obtain the first location of the computer-readable memory of the server system. The method further includes generating, by the server system in response to a transfer of usage rights of the data processing device from the first user to a second user, second secret data associated with the second user and corresponding to a second location of the computer-readable memory of the server system, and providing, by the server system to the data processing device, the second secret data for generating a second URL usable to obtain the second location of the computer-readable memory of the server system. The second location of the computer-readable memory of the server system is inaccessible via the first URL. The first location of the computer-readable memory of the server system is inaccessible via the second URL.

BRIEF DESCRIPTION OF THE DRAWINGS

FIG. 8 illustrates example secret data for data access at a remote resource.

DETAILED DESCRIPTION

According to techniques of this disclosure, a data processing system can manage access (e.g., data read and/or write access) to a remote resource, such as a server or cloud platform, using secret data corresponding to the location of the remote resource. A data processing device, for example, can generate an obscured (e.g., encrypted) uniform resource locator (URL) using the secret data, and can obtain the location of the remote resource via the obscured URL. In some examples, the secret data can include an encryption key to further protect access to data stored at the location of the remote resource. In this way, rather than merely encrypt data at the remote resource, the data processing system can manage access to data at the remote resource via an obscured (e.g., "secret") location of the remote resource. As such, access to (or "ownership" of) data stored at the remote resource can be efficiently managed based on knowledge of the secret data corresponding to the location of the data. For instance, device-specific secret data can be used for access to data corresponding to the data processing device, while user-specific secret data can be used for access to data corresponding to a particular user. Accordingly, data access and associated privacy rights can be preserved during, e.g., shared use of a device by multiple users and/or transfer of the device (e.g., transfer of ownership and/or usage rights) between users. Likewise, access to ownership-agnostic data, such as data associated with the device itself, can be maintained regardless of the ownership and/or usage rights associated with the device.

Figure 1:
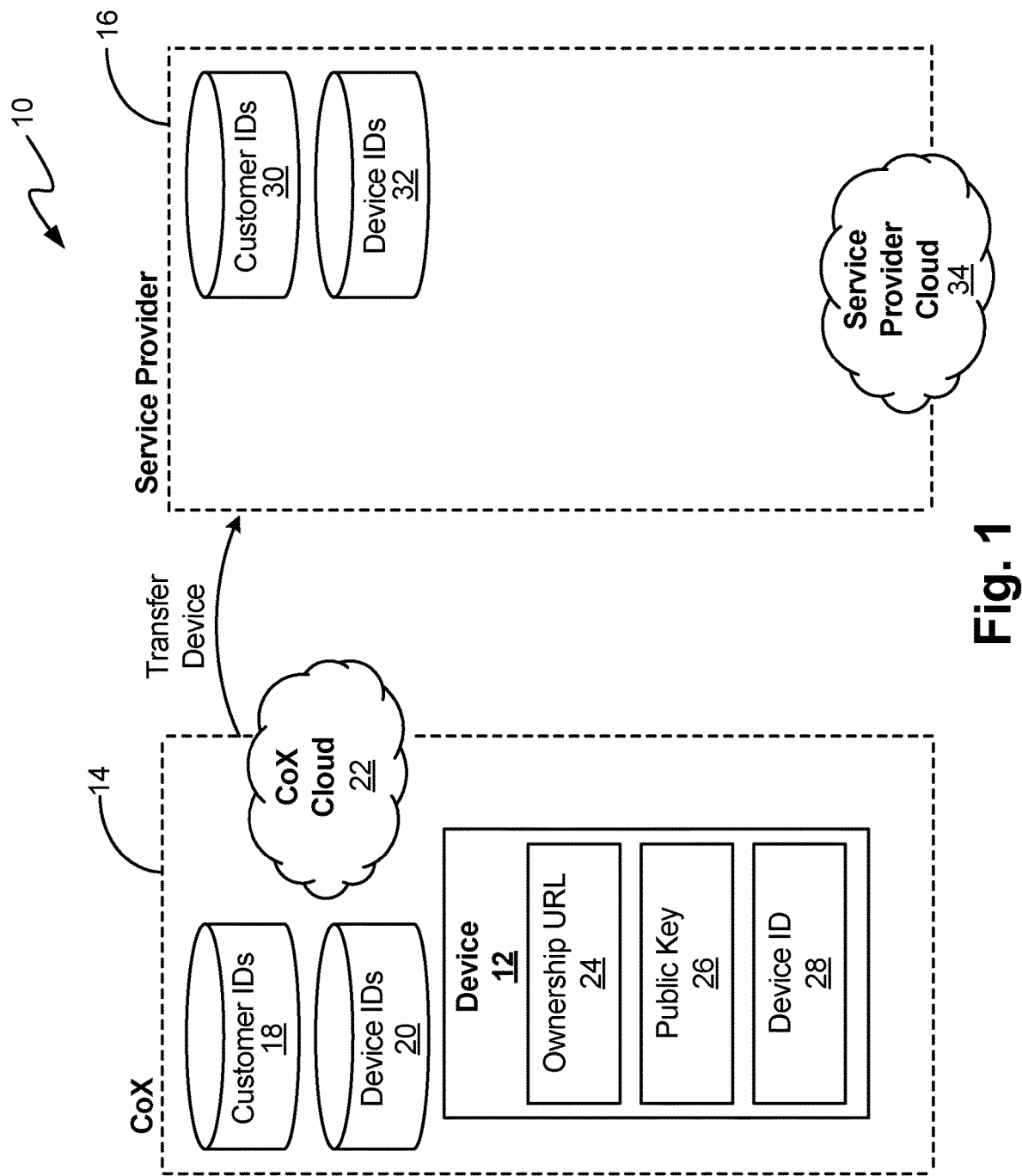
FIG. 1 is a block diagram illustrating an example data processing system that can be used to manage data access during a transfer of ownership of a data processing device.

FIG. 1 is a block diagram illustrating an example data processing system 10 that can be used to manage data access during a transfer of ownership of data processing device 12. As illustrated in FIG. 1, data processing system 10 can involve company X (CoX) 14 and service provider 16. CoX 14 can include data processing device 12, customer identification store (customer IDs) 18, device identification store (device IDs) 20, and CoX cloud 22. Data processing device 12 can include ownership URL 24, public key 26, and device identifier (device ID) 28. Service provider 16 can include customer identification store (customer IDs) 30, device identification store (device IDs) 32, and service provider cloud 34.

In the example of FIG. 1, CoX 14 manufactures data processing device 12, which may be a temperature sensor, healthcare monitor, electronic door lock, light source, security system, or other such device. In general, data processing device 12 can be any device including processing and communication circuitry capable of transmitting and/or receiving data via one or more wired or wireless communications networks. For instance, as in the example of FIG. 1, data processing device 12 can be a blood pressure monitoring device configured for home use to periodically monitor a user's blood pressure and transmit and/or receive data corresponding to the monitored blood pressure data with a remote device, such as a remote device maintained or operated by service provider 16, as is further described below.

As illustrated in FIG. 1, CoX 14 maintains customer IDs 18 and device IDs 20. Each of customer IDs 18 and device IDs 20 can be a data store, such as a database or other organizational tool for storing data according to a defined schema to facilitate later retrieval of the data. For instance, any one or more of customer IDs 18 and device IDs 20 can include one or more relational databases, hierarchical databases, object-oriented databases, multi-dimensional databases, or other types of databases configured to store data usable by CoX 14 to store and retrieve information corresponding to manufactured devices, such as data processing device 12, and corresponding users (e.g., customers).

CoX 14 can maintain or utilize CoX cloud 22. CoX cloud 22 can include any one or more interconnected computing devices, such as server devices, mainframe computers, or other computing devices capable of storing and accessing information and/or distributing functional operations of, e.g., an application or service among the various connected devices. In some examples, CoX cloud 22 can be a single networked computer, though in general, CoX cloud 22 may typically take the form of multiple interconnected computing devices. In some examples, one or more of customer IDs 18 and device IDs 20 can be maintained within CoX cloud 22.

As illustrated in FIG. 1, service provider 16 can include customer IDs 30, device IDs 32, and service provider cloud 34. In general, customer IDs 30 and device IDs 32 can be similar to (though separate from) customer IDs 18 and device IDs 20, but likely including different information and/or organizational structures or schemas. That is, one or more of customer IDs 30 and device IDs 32 can be and/or include databases such as object oriented databases, relational databases, or other types of databases. Service provider cloud 34, similar to CoX cloud 22, can include any one or more interconnected computing devices, such as servers, mainframes, and the like. In some examples, CoX cloud 22 and service provider cloud 34 can be part of a same cloud network. In other examples, such as the example of FIG. 1, CoX cloud 22 and service provider cloud 34 can be communicatively connected via one or more wired or wireless communication networks, such as cellular networks, wide area networks (WANs) such as the Internet, local area networks (LANs), wireless local area networks (WLANs), or other types of networks.

In the example of FIG. 1, CoX 14 manufactures various devices, including, e.g., data processing device 12. Data processing device 12, as illustrated, includes device ID 28. Device ID 28 can be any unique identifier of data processing device 12, such as a serial number. Device ID 28, in some examples, takes the form of a serial number applied (e.g., externally applied) to data processing device 28, such as via a printed serial number and/or a scannable bar code or quick response (QR) code. In certain examples, device ID 28 can be a unique identifier stored within computer-readable memory of data processing device 12 and accessible via communications circuitry of data processing device 12. In general, device ID 28 can be any identifier capable of uniquely identifying data processing device 12. CoX 14 stores, within device IDs 20, device ID 28 of data processing device 12.

CoX 14 can pre-provision data processing device 12 with ownership URL 24 and public key 26, such as by storing ownership URL 24 and public key 26 within computer-readable memory of data processing device 12. Public key 26 can be an encryption key usable to encrypt data transmitted by data processing device 12 and/or to verify a digital signature of a transmitting remote device. For instance, data processing device 12, or any one or more devices within data processing system 10 having knowledge of public key 26, can utilize public key 26 to verify a digital signature of a transmitting device. For example, ownership URL 24 can specify a location of CoX cloud 22, such as an internet protocol (IP) address, a network address, a port, or other address corresponding to computer-readable memory of a computing device within CoX cloud 22. CoX 14 can store, at the location identified by ownership URL 24, a digital certificate usable for verifying the authenticity and/or integrity of a digital message or other data. In addition, CoX 14 can store, at the location identified by ownership URL 24, one or more instructions for accessing a remote resource (i.e., remote from CoX cloud 22) at which an intermediate certificate can be located (e.g., at an alternate ownership URL) for verifying the authenticity and/or integrity of digital messages or other data originating from the remote resource. In this way, CoX 14 can initiate a certificate chain (or chain of trust) that is usable to verify authenticity of each resource included in the chain. Data processing device 12, upon power-up, can access ownership URL 24, access a location of a remote resource specified by an alternate URL at ownership URL 24, verify the certificate chain located at the alternate URL using public key 26, and commence trusted communications with the remote resource. Accordingly, CoX 14 can enable a transfer (or chain) of trusted communications (e.g., associated with transfers of ownership or usage rights) with data processing device 12 without requiring specific communications with data processing device 12 at the time of each transfer.

As one example operation of data processing system 10, data processing device 12 can be a blood pressure monitoring device, CoX 14 can be a manufacturer of data processing device 12, and service provider 16 can be a health care service provider, such as an insurance company or other service provider. CoX 14 can store device ID 28 of data processing device 12 within device IDs 20. In addition, CoX 14 can store public key 26 (which may be unique to data processing device 12) at computer-readable memory of data processing device 12, and can associate public key 26 with device ID 28 within device IDs 20. CoX 14 can additionally store ownership URL 24 within computer-readable memory of data processing device 12. Ownership URL 24 can specify a location within CoX cloud 22 (e.g., a location of a server device within CoX cloud 22) at which a digital certificate of authenticity can be located, such as the URL www.coX/PiP s/Cario-id1.

Service provider 16 (e.g., a health care service provider in this example) can request a transfer of ownership (e.g., sale) of data processing device 12 from CoX 14 to service provider 16. In some examples, service provider 16 can request the transfer of ownership in response to a user request (e.g., via a doctor or other healthcare provider) for use of data processing device 12. In such examples, service provider 16 can optionally transmit a user identification to CoX 14, which can associate device ID 28 of data processing device 12 with the received user identification within customer IDs 18. In response to the request for ownership transfer, CoX 14 can transmit device ID 28 of data processing device 12 as well as public key 26 and the digital certificate of authenticity encrypted with (or "signed" by) public key 26 to service provider 16. Service provider 16 can store device ID 28 within device IDs 32, and can associate device ID 28 with the appropriate user identification stored within customer IDs 30. In addition, service provider 16 can associate public key 26 with device ID 28, such as within device IDs 32. CoX 14 can store, at the location of CoX cloud 22 specified by ownership URL 24, data identifying a location of service provider cloud 34 at which the certificate chain of authenticity can be located, such as the URL www.ServiceProviderX/PiPs/Cardio-id1.

As is further described below, data processing device 12 can access ownership URL 24 upon power-up, which directs data processing device 12 to access the alternate URL at service provider cloud 34. Data processing device 12 can access the certificate chain located at the alternate URL within service provider cloud 34, verify the certificate chain signed by service provider 16 using public key 26, and commence trusted communications with the remote resource of service provider cloud 34. Accordingly, data processing system 10 can enable a transfer of ownership and corresponding trusted communications with data processing device 12 without requiring direct communications regarding the transfer with data processing device 12.

While the example of FIG. 1 is described herein with respect to a single transfer of ownership between a manufacturer of data processing device 12 (e.g., CoX 14) and a service provider (e.g., service provider 16), it should be understood that the techniques described herein are applicable to multiple such transfers between any two entities taking ownership of, or acquiring usage rights to data processing device 12. For instance, in practice, there may be multiple transfers of ownership of data processing device 12 between CoX 14 and service provider 16, such as to any one or more of a wholesaler, distributer, or other entity included in a logistical chain between CoX 14 and service provider 16 or an end user of data processing device 12. In general, the certificate chain and alternate URL techniques can be extended to include any number of such transfers. Similarly, while the example operations are described herein with respect to a transfer of ownership, it should be understood that the techniques are also applicable to transfers of usage rights (e.g., rentals or leases) of data processing device 12. In this way, techniques of this disclosure can enable multiple transfers of ownership and/or usage rights of data processing device 12 without requiring the logistically-burdensome task of applying power to and initiating communications with data processing device 12 at each of the transfers.

Figure 2:
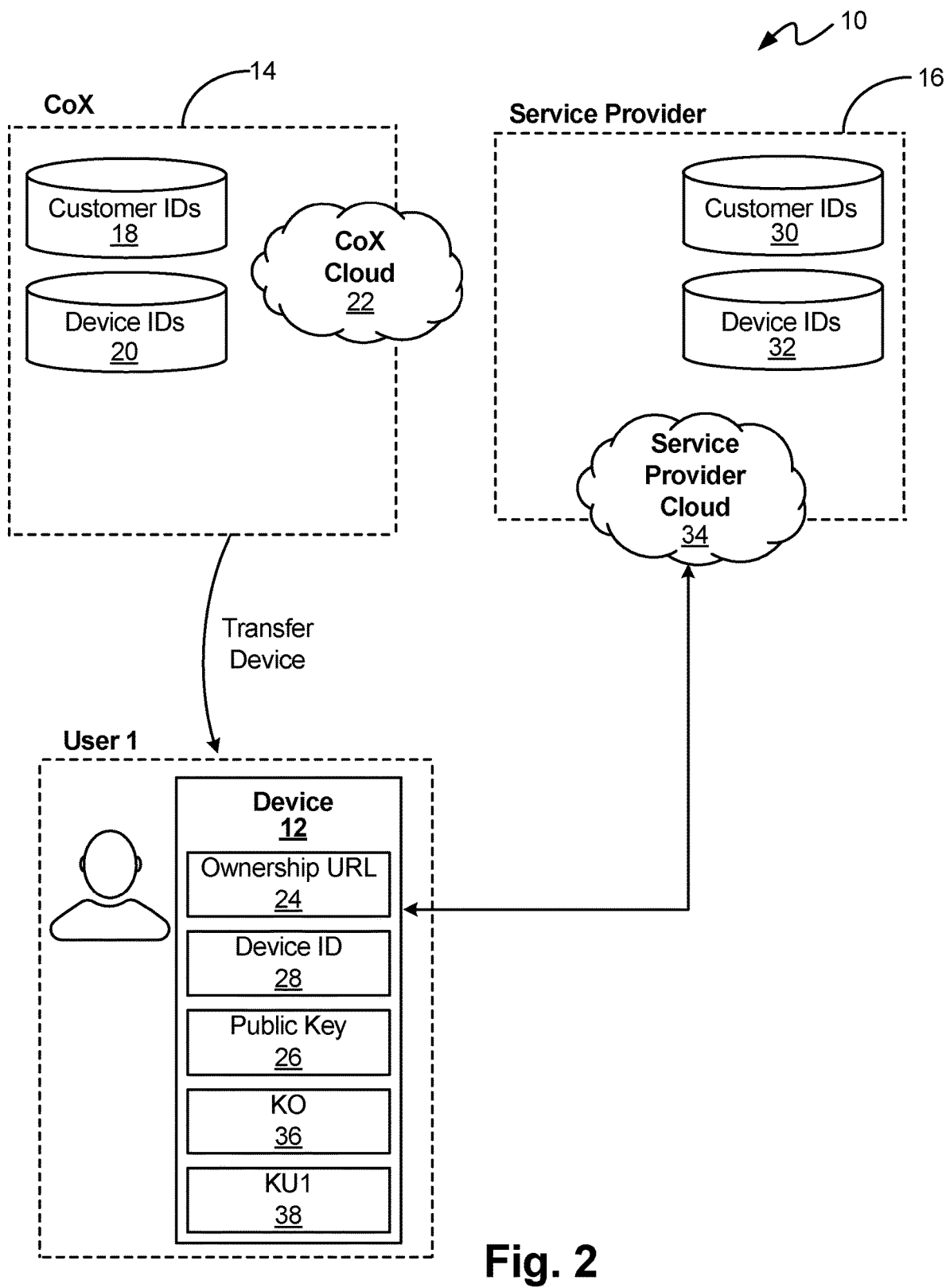
FIG. 2 is a block diagram illustrating a transfer of usage rights of the data processing device.

FIG. 2 is a block diagram illustrating a transfer of usage rights of data processing device 12 to user 1. As illustrated in FIG. 2, data processing device 12 can be physically transferred to user 1 (i.e., to the physical possession of user 1), such as at the request of service provider 16 after (or concurrent with) the transfer of ownership illustrated in the example of FIG. 1. While illustrated in FIG. 2 as being transferred directly from CoX 14 to user 1, in other examples, data processing device 12 can be transferred through one or more intermediate parties, such as service provider 16, a distributer, a wholesaler, or other logistical hub as directed by CoX 14 and/or service provider 16.

In the example of FIG. 2, user 1 receives and powers-on data processing device 12. Upon start-up, data processing device 12 accesses ownership URL 24 which, as in the example of FIG. 1, can be a URL (e.g., www.coX/PiPs/Cario-id1) identifying a location of a remote resource (e.g., a server device or memory location) within CoX cloud 22. Data processing device 12, in this example, receives a command signed by CoX 14 using public key 26 at the location identified by ownership URL 24 directing data processing device 12 to an alternate remote resource within service provider cloud 34, such as the location identified by the URL www.ServiceProviderX/PiPs/Cardio-id1. Data processing device 12, upon receiving the command, accesses the alternate remote resource within service provider cloud 34 at which a certificate chain of authenticity is located, signed by CoX 14 and service provider 16 using public key 26. Data processing device 12, in response to verifying the authenticity of the remote resource within service provider cloud 34, commences trusted communications with the remote resource. In some examples, service provider 16 (e.g., via the trusted communications) can provide a changed public key to replace public key 26, thereby preventing possible communications with entities, such as CoX 14, having knowledge of public key 26. In such examples, communications between service provider 16 and data processing device 12 are encrypted (i.e., signed) by service provider 16 using the newly-provided public key.

As illustrated in FIG. 2, service provider 16 provides ownership key (KO) 36 and user 1 key (KU1) 38 to data processing device 12 via a communications message signed using public key 26. Data processing device 12 can utilize KO 36 and KU1 38 for access to data at location(s) of service provider cloud 34 (also referred to herein as a remote resource) corresponding to KO 36 and KU1 38, respectively. Access to the remote resource can include, for example, writing data to the remote resource, reading data from the remote resource, and/or instructing a device associated with the remote resource to carry out an action. As an example, each of KO 36 and KU1 38 can include one or more of content encoding information (e.g., using an encryption key) and a URL transformation, the aggregation of which is referred to herein as "secret data." The content encoding information can define how to encode data content or transactions to be sent to the remote resource, such as via an encryption key using the Advanced Encryption Standard (AES) 192 algorithm.

The URL transformation can include URL encoding information which specifies how to generate an obscured URL of the remote resource. That is, techniques of this disclosure recognize that it is not just data stored at a remote resource that may contain personal or sensitive information. Rather, the URL from which the resource is accessed may itself give away information. For instance, a user may have a device with a URL that includes information about the type, make, model, function, or location of the device, or information about the user who owns or uses the device. Similarly, a website may have a URL which may contain information describing or hinting at the interests or details of the person running the website. As such, to help maintain privacy of data, KU1 38 can include URL transformation information that specifies how to generate an obscured URL corresponding to the location of the remote resource. In a similar manner, KO 36 can include both an encryption key and a URL transformation corresponding to a same or different location of the remote resource. Data processing device 12 can utilize the obscured URL(s) to access the remote resource at locations corresponding to the obscured URL(s), thereby enabling access to the remote resource without revealing personal or sensitive information about the user or the device.

As an example, data processing device 12 can obtain an initial URL corresponding to the remote resource. The initial URL may be an intuitive URL with descriptive data about what the data at the remote resource means, thereby enabling user 1 to utilize a more natural looking URL (e.g., http://domain/health/alicesmith/bloodpressure/ . . . ) which has a structure that allows authorized users of the remote resource to intuitively understand what the data at a particular URL represents and how the URL relates to other URLs. The initial URL can be obtained in various ways, such as by user 1 typing a URL, by clicking a link from an email or other website, or by data processing device 12 accessing a previously stored URL or a URL stored at computer-readable memory of data processing device 12. Using the secret data (e.g., KO 36 and/or KU1 38), data processing device 12 can generate an obscured URL usable to obtain the actual location of the remote resource. In this way, the actual location of the remote resource can be identified by the obscured URL, which can be any random string of characters (e.g., http://domain/a18b828f829e9 . . . ) that does not give away personal information. Moreover, the secret data enables the initial URL to be mapped to the corresponding obscured URL at data processing device 12, so that the initial URL need not be known to the network infrastructure, thereby further enhancing privacy of data.

Figure 3:
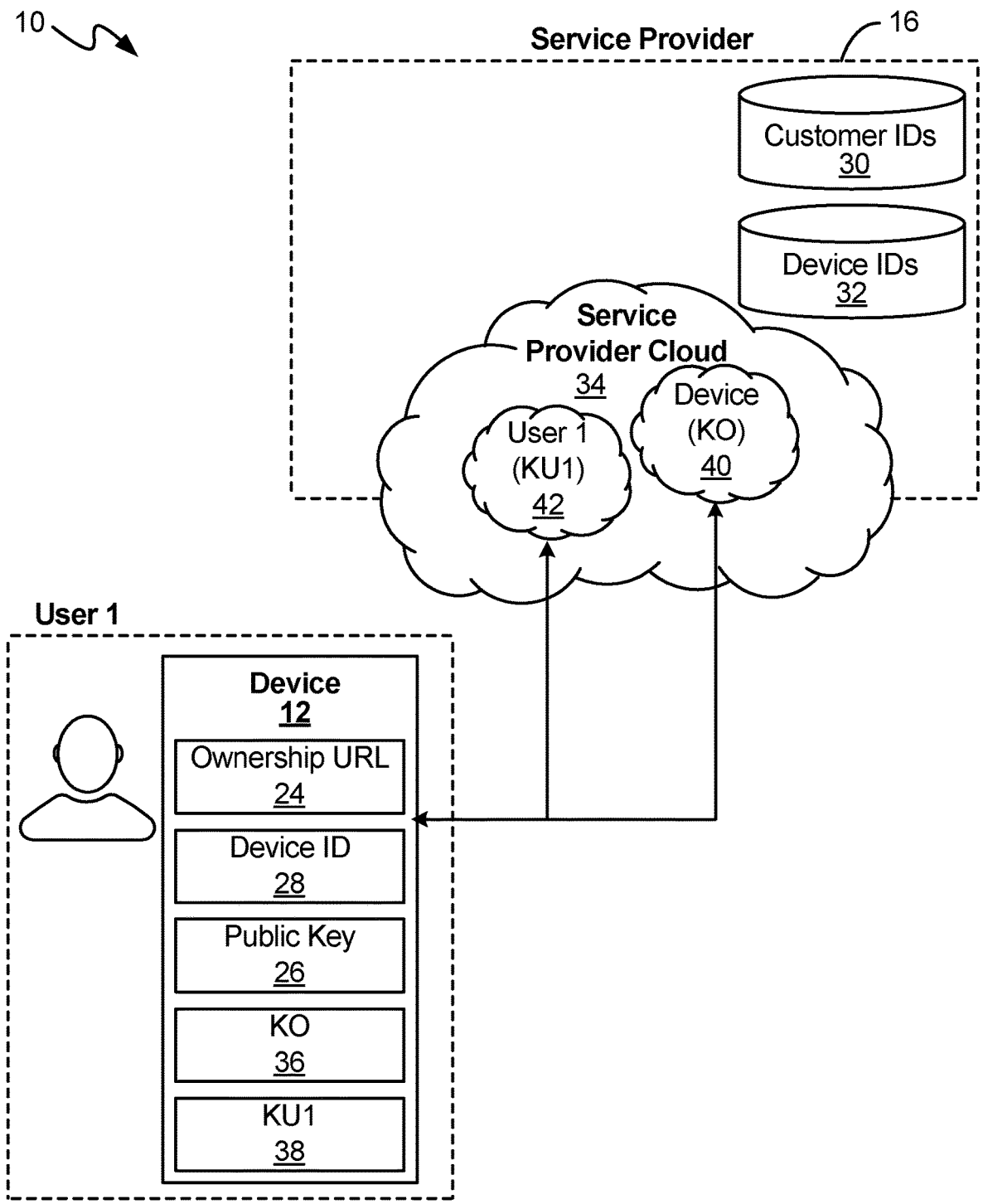
FIG. 3 is a block diagram illustrating data access of the data processing device at a remote resource using secret data.

FIG. 3 is a block diagram illustrating data access by data processing device 12 at service provider cloud 34 using secret data KO 36 and KU1 38. As illustrated in FIG. 3, data processing device 12 can access user 1 location 42 and device location 40 of service provider cloud 34. User 1 location 42 and device location 40, as illustrated, can be separate locations within service provider cloud 34. The separate locations can be, for example, separate locations of a same computing device within service provider cloud 34. In some examples, the separate locations can be separate locations of different computing devices within service provider cloud 34. Data processing device 12 can utilize secret data KU1 38 for access to user 1 location 42, and can utilize secret data KO 36 for access to device location 40. For instance, as described above, data processing device 12 can utilize a first URL transformation included with secret data KU1 38 to obtain a first obscured URL corresponding to user 1 location 42. Data processing device 12 can utilize a second URL transformation included with secret data KO 36 to obtain a second, different obscured URL corresponding to device location 40. As such, device location 40 can be inaccessible via the first obscured URL corresponding to secret data KU1 38. Similarly, user 1 location 42 can be inaccessible via the second obscured URL corresponding to secret data KO 36. In this way, data processing device 12 can utilize secret data corresponding to different locations of a remote resource, such as service provider cloud 34, to provide secure access to data stored at the different locations.

In operation, data processing device 12 can access the differing locations of the remote resource (e.g., user 1 location 42 and device location 40) based on, e.g., a category of data to be accessed. For example, data processing device 12 can access user 1 location 42 using secret data KU1 38 with respect to data that may be categorized as personal to user 1. Data processing device 12 can access device location 40 using secret data KO 36 with respect to data that may be categorized as relevant to data processing device 12. For instance, in examples where data processing device 12 is a health monitoring device, such as a blood pressure monitoring device, data processing device 12 can access (e.g., read and/or write) data at user 1 location 42 corresponding to monitored blood pressure data, times at which blood pressure readings were sensed by data processing device 12, or other such data that can be categorized as relevant to user 1 but not necessarily to another entity having access to service provider cloud 34, such as a different user, a maintenance technician of data processing device 12, or other such entity. Similarly, data processing device 12 can access (e.g., read and/or write) data at device location 40 corresponding to a total amount of time that data processing device 12 has been active, a current software and/or firmware version executed by data processing device 12, a total number of blood pressure readings sensed by data processing device 12, or other such data that can be categorized as relevant to an entity responsible for, e.g., maintenance of data processing device 12.

In this way, data processing device 12 can enable access to authorized users with respect to particular categories of data. That is, because the secret data (e.g., KO 36 and KU1 38) can each include a different URL transform that corresponds to a different location of a remote resource, access to data at the respective locations of the remote resource can be efficiently managed via knowledge of the corresponding secret data. For instance, a doctor or other entity can be provided access to data at user 1 location 42 via knowledge of secret data KU1 38. In addition, those users or devices without knowledge of secret data KU1 38, for example, are denied access to user 1 location 42, as the obscured URL corresponding to user 1 location 42 cannot be generated without secret data KU1 38.

While the example of FIG. 3 has been illustrated and described for purposes of clarity and ease of illustration with respect to two secrets (e.g., KO 36 and KU1 38) corresponding to two separate locations of the remote resource (e.g., device location 40 and user 1 location 42), it should be understood that the techniques of this disclosure are not so limited. For instance, data processing device 12 can utilize more than two sets of secret data to access more than two separate locations of the remote resource. As an example, data processing device 12 can utilize third secret data corresponding to a third location of service provider cloud 34, such as to enable access to data relevant to an insurance company or other such entity, without providing access to device location 40 or user 1 location 42. In addition, the transformed (e.g., obscured) URLs need not correspond to different locations of the remote resource. Rather, any two or more of the transformed URLs can correspond to a same location of the remote resource.

Accordingly, the techniques described herein can enable enhanced security and privacy of data provided to service provider cloud 34 through the use of the obscured URLs (and encryption techniques via the corresponding encryption keys associated with the secret data), as well as efficient management of access to, e.g., differing categories of data through knowledge of the appropriate secret data. Moreover, the techniques can enable efficient management of data access (or "ownership") in response to a transfer of ownership or usage rights of data processing device 12, as is further described below.

Figure 4:
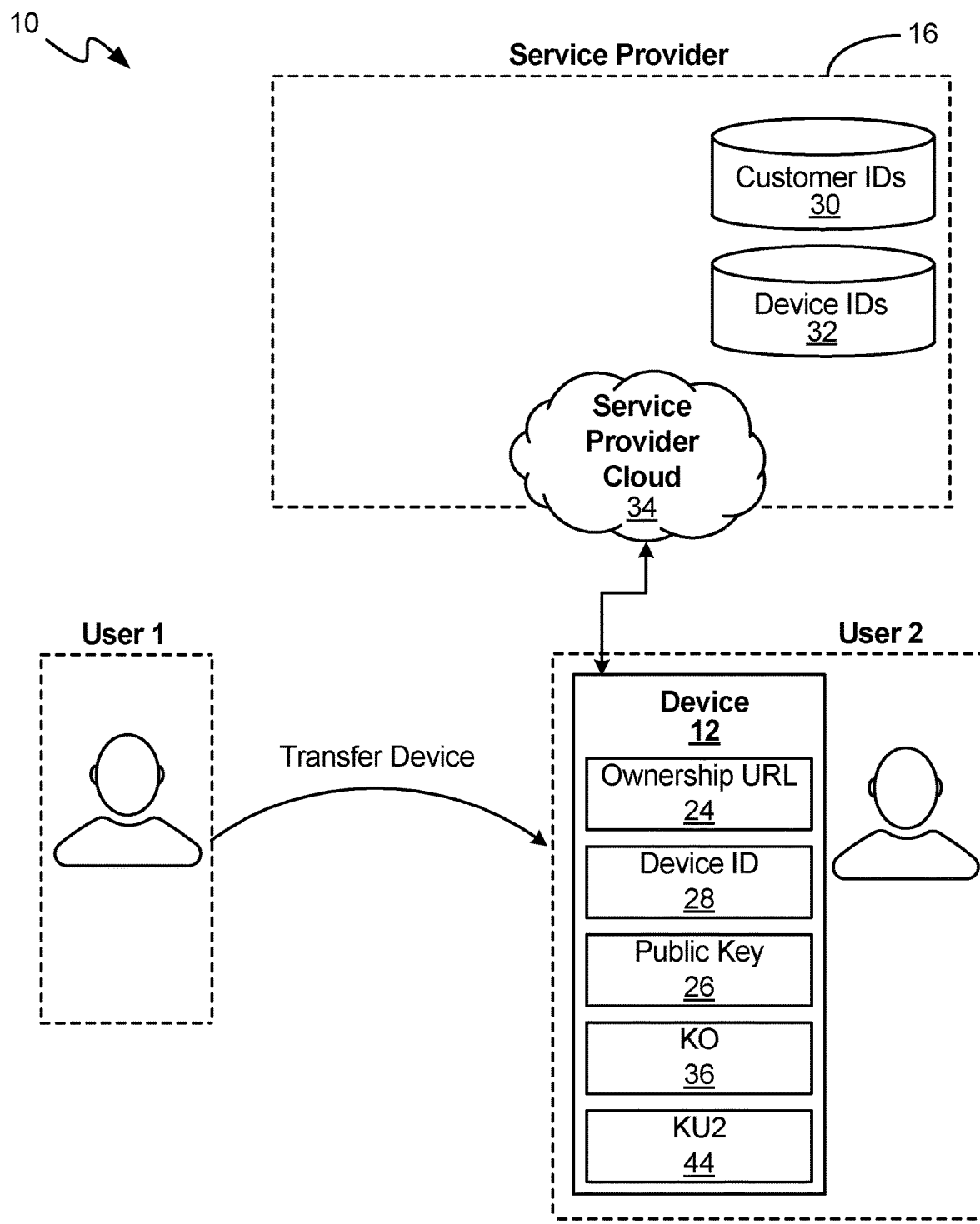
FIG. 4 is a block diagram illustrating a transfer of usage rights of the data processing device from a first user to a second user.

FIG. 4 is a block diagram illustrating a transfer of usage rights of data processing device 12 from user 1 to user 2. As illustrated in FIG. 4, data processing device 12 can be physically transferred from user 1 to user 2 (i.e., to the physical possession of user 2). For instance, as in the examples described above, data processing device 12 can a blood pressure monitoring device configured for home use to monitor a user's blood pressure. It may be desirable, in some cases, to transfer the physical possession of data processing device 12 from, e.g., user 1 to user 2, such as when user 1 is no longer in need of the device. In this way, service provider 16, which may be an owner of data processing device 12, can rent, lease, or otherwise transfer usage rights to data processing device 12 among multiple users. While illustrated in FIG. 4 as a direct physical transfer of data processing device 12 from user 1 to user 2, in operation, the physical possession may be transferred through one or more intermediate parties. For example, service provider 16 may coordinate the indirect physical transfer of data processing device 12 from user 1 to user 2 through a distributer or other logistical operator, thereby helping to preserve privacy among users. In other examples, such as when data processing device 12 is part of e.g., a home, the transfer may occur through a change in possession by the users, rather than through physical movement of data processing device 12. In general, the techniques of this disclosure are applicable to any transfer of ownership and/or usage rights between entities and/or users.

As illustrated in FIG. 4, data processing device 12 can obtain user 2 key (KU2) from service provider cloud 34 in response to the transfer of usage rights from user 1 to user 2. For example, in response to the transfer of usage rights, service provider cloud 34 can transmit a command to data processing device 12 (e.g., signed by public key 26) to replace KU1 38 with KU2 44, such as by deleting KU1 38 from the computer-readable memory of data processing device 12 and storing KU2 44 in the computer-readable memory (e.g., overwriting the data in memory). KU2 44, similar to KO 36 and KU1 38, can be considered secret data including one or more of an encryption key and a URL transform corresponding to a location of a remote resource at, e.g., service provider cloud 34. Data processing device 12 can, for example, utilize secret data KU2 44 to obtain a transformed (e.g., obscured) URL corresponding to a location of the remote resource that is different than the location corresponding to secret data KU1 38. In addition, because KU1 38 is removed from (or "forgotten" by) data processing device 12, data processing device 12 can refrain from accessing the location of the remote resource corresponding to KU1 38. Indeed, without knowledge of KU1 38, data processing device 12 can no longer generate the obscured URL corresponding to secret data KU1 38, and therefore cannot access the location of the remote resource corresponding to KU1 38. In this way, service provider 12 can efficiently control access to data at the location of the remote resource corresponding to KU1 38 by controlling the knowledge of KU1 38.

Figure 5:
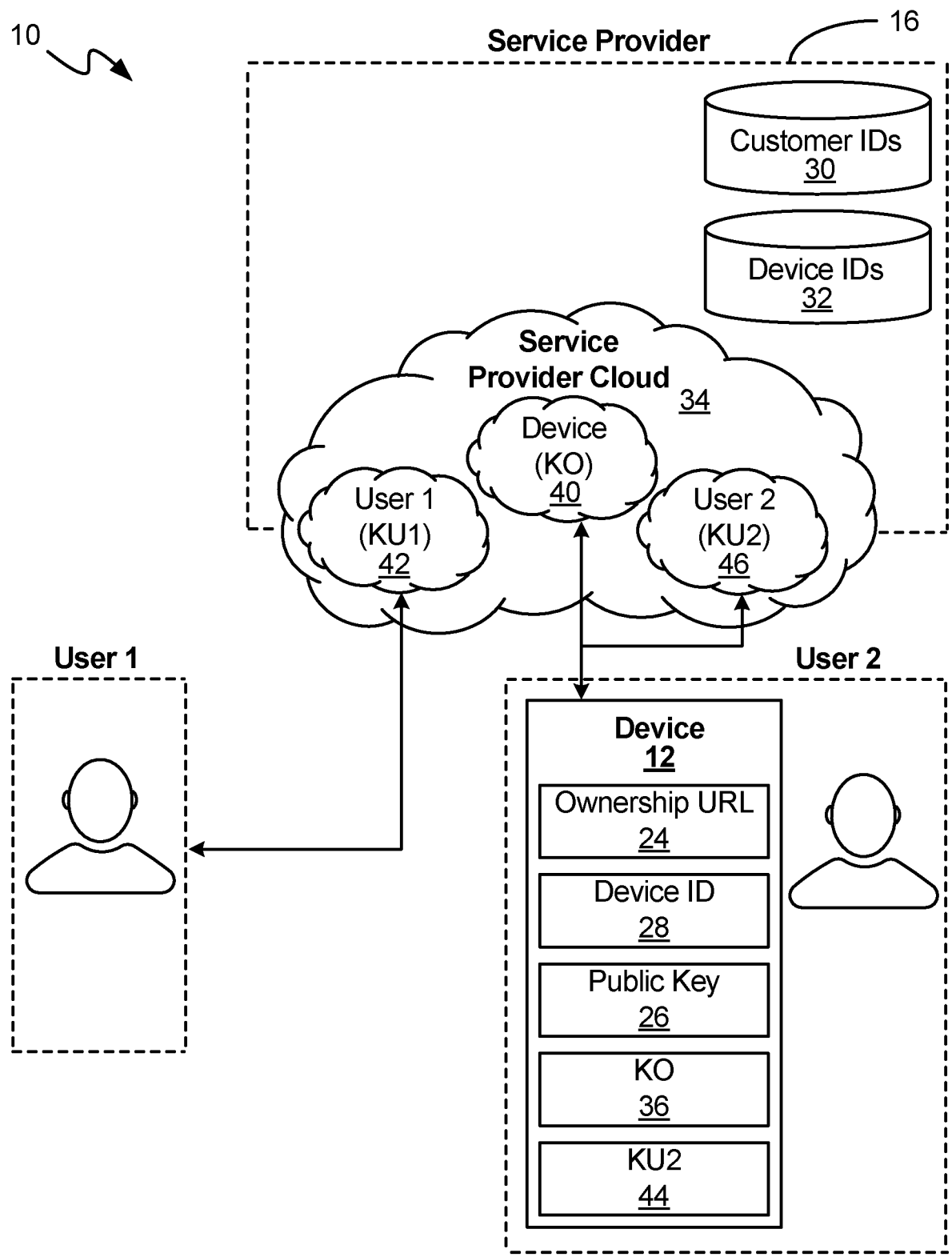
FIG. 5 is a block diagram illustrating data access of the data processing device after the transfer of usage rights from the first user to the second user.

FIG. 5 is a block diagram illustrating data access of data processing device 12 after the transfer of usage rights from user 1 to user 2. As illustrated in FIG. 5, data processing device 12, after transfer of usage rights from user 1 to user 2 and the corresponding "rotation" of secret data KU1 38 with KU2 44 within computer-readable memory of data processing device 12, can access (e.g., read and/or write) data at user 2 location 46 of service provider cloud 34. That is, data processing device 12 can utilize secret data KU2 44 to obtain a third obscured URL identifying user 2 location 46 of service provider cloud 34. As illustrated, user 2 location 46 can be inaccessible via either the first or second obscured URLs corresponding to KO 36 and KU1 38, respectively. In this way, data processing device 12 can enable user 2 to have access to data at user 2 location 46 that may be personal in nature to user 2 without enabling user 1 to have access to the data (i.e., without knowledge of secret data KU2 44). Similarly, data processing device 12 can enable user 1 to have continued access to data at user 1 location 42 via knowledge of secret data KU1 38 (e.g., via a smartphone, laptop computer, desktop computer, or other computing device with knowledge of KU1 38) without enabling user 2 to have access to the data. As illustrated, data processing device 12 can continue to access data at device location 40 via the continued knowledge of KO 36 corresponding to device location 40.

As such, techniques of this disclosure can enable efficient and secure management of data access at a remote resource through the controlled knowledge of secret data associated with one or more locations of the remote resource. The techniques can enable ownership and/or usage-agnostic data to effectively "follow" a device, while at the same time enabling user-centric data to effectively "follow" the particular user. In this way, techniques of this disclosure can promote usability and security of networked devices, such as those devices considered part of the Internet of Things.

Figure 6:
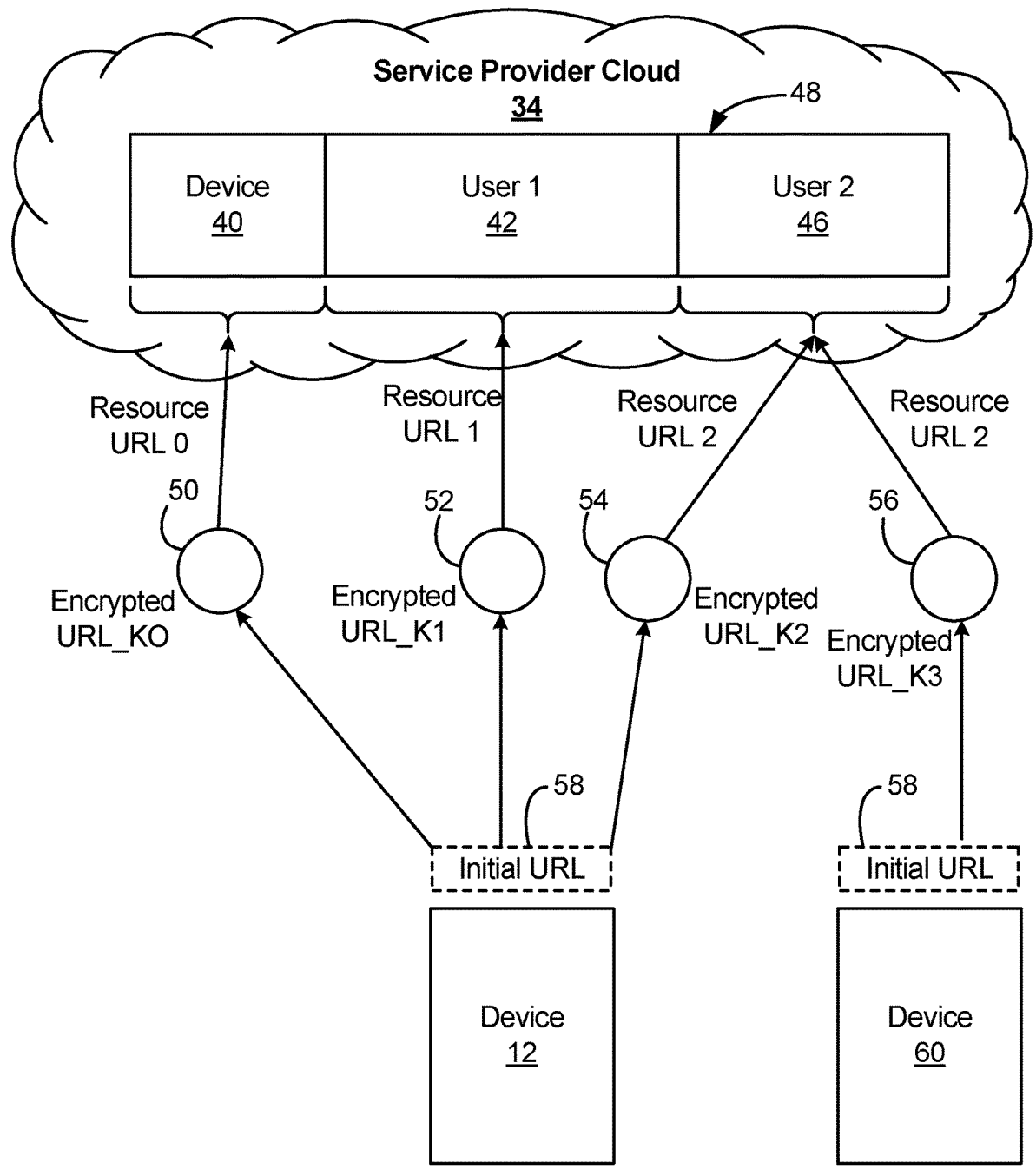
FIG. 6 is a block diagram illustrating an example of data access of the remote resource utilizing key node resources.

FIG. 6 is a block diagram illustrating an example of data access of remote resource 48 utilizing key node resources 50, 52, 54, and 56. In the example of FIG. 6, remote resource 48 is part of service provider cloud 34. In other examples, any one or more portions of remote resource 48 can be distributed among networks, such as between different cloud networks. In general, remote resource 48 can correspond to any data or device access remotely by data processing device 12. Examples of remote resource 48 can include, but are not limited to, a data processing device or embedded system which can be controlled remotely from another platform, a remote computer, a content aggregator, a server device or network of servers, or a website or server accessible from data processing device 12.

The example of FIG. 6 illustrates how different representations of a same remote resource (e.g., remote resource 48) can be efficiently managed using key node resources. As illustrated in FIG. 6, data processing device 12 can utilize secret data, such as secret data KO 36, KU1 38, and KU2 44, to obtain obscured (e.g., encrypted) URLs from initial URL 58, which can be an intuitive (e.g., non-obscured) URL with descriptive data about the data at remote resource 48. For instance, as illustrated in FIG. 6, data processing device 12 can obtain encrypted URL_KO using secret data KO 36, encrypted URL_K1 using secret data KU1 38, and encrypted URL_K2 using secret data KU2 44. In addition, data processing device 60, which can be similar to data processing device 12 (or any computing device with processing and communications circuitry for accessing a remote resource), can obtain encrypted URL_K3 using secret data that includes a URL transformation.

Each key node resource 50, 52, 54, and 56, includes data for obtaining the actual resource URL of remote resource 48 corresponding to the associated secret data. As such, different users (or devices) can be provided with access to different parts of the remote resource by specifying different resource URLs at the key node (or by specifying the same resource URL but with different pieces of associated information identifying which parts of the URL are accessible). For instance, in the example of FIG. 6, data processing device 12 and data processing device 60 access key nodes 54 and 56, respectively, to obtain resource URL 2 (e.g., http://abc.com/data/18659458.php), which enables access to user 2 location 46. Data processing device 12, in addition, accesses key node 50 to obtain resource URL 0, which enables access to device location 40, and key node 52 to obtain resource URL 1, which enables access to user 1 location 42. As such, the different resource URLs provided by each key node can correspond to same, different, or overlapping parts of remote resource 48. In other examples, the resource URLs provided by different key nodes can correspond to different remote resources entirely.

In this way, each secret data includes a URL transformation that maps the initial URL to a corresponding obscured URL, which is used to access a corresponding key node resource. The key node resource can then provide further data redirecting the device to the corresponding resource URL of the remote resource. The data each key node resource can include, e.g., the corresponding resource URL itself, data for calculating the corresponding resource URL, or data identifying another remote location from which the resource URL can be obtained. As with the obscured URLs, each resource URL can also be an obscured (e.g., encrypted, or otherwise non-intuitive) URL that does not include sensitive information. In some examples, any one or more of key nodes 50, 52, 54, and 56 can include (e.g., store) data for decrypting content at the corresponding resource URL. As such, only authorized users (or devices) that have successfully located a key node for remote resource 48 can obtain the corresponding decryption key for decrypting content stored at remote resource 48.

Accordingly, techniques described herein can enable efficient management of access to data at a remote resource utilizing key node resources. In addition, the key node resource techniques can enable efficient access management, such as to revoke access to the remote resource by removing the key node resource at the URL generated using the corresponding secret data, as is further described below.

Figure 7:
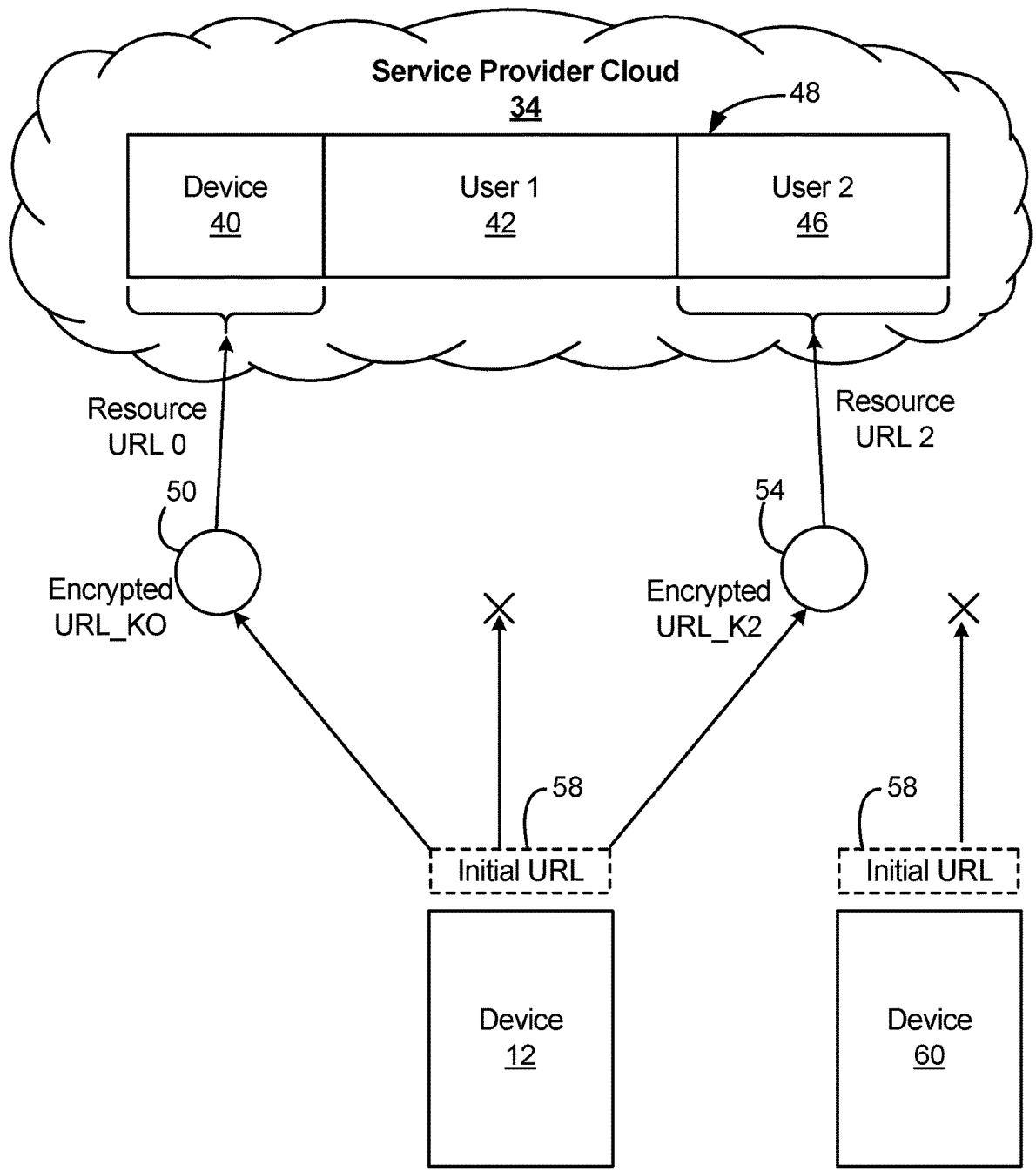
FIG. 7 is a block diagram illustrating an example of data access of the remote resource after a key node resource has been removed.

FIG. 7 is a block diagram illustrating an example of data access of remote resource 48 after a key node resource has been removed. As illustrated in the example of FIG. 7, each of key node 52 and key node 56 have been removed. Accordingly, encrypted URL_K1, obtained via the URL transformation included with secret data KU1 38, no longer points to a valid resource. Hence, data processing device 12, in this example, can no longer access user 1 location 42, as resource URL 1 (identifying user 1 location 42) is no longer available. Similarly, encrypted URL_K3 no longer points to a valid resource, and data processing device 60 is therefore denied access to user 2 location 46. As such, access by data processing device 60 (or the associated user) to data at user 2 location 46 can be revoked without moving resource URL 2, thereby leaving data processing device 12 (or the associated user) unaffected by the revocation of access rights.

FIG. 8 illustrates example secret data 62 for data access at a remote resource, such as remote resource 48 of FIGS. 6 and 7. As illustrated in FIG. 8, secret data 62 can include scope 64, which specifies the remote resources to which the secret data applies. In this example, scope 64 indicates the paths or sub-paths of the resources to which the secret data applies. As illustrated, in the example of FIG. 8, secret data applies to the path "/data". Implicitly, the secret data can also apply to all sub-paths of the path indicated by scope 64. Hence, access to resources not within the specified path (including sub-paths) may not succeed. In other examples, scope 64 can specify further conditions to be met to enable successful access, such as time-based or use-based conditions.

Secret data 62 also includes URL encoding information 66, which specifies how to generate the obscured URL of the resource. In this example, URL encoding information 66 includes secret string 68 to be used as a key for transforming the initial URL (e.g., initial URL 58 of FIGS. 6 and 7) into the obscured URL, transformation data 70 defining a transformation to use for generating an encoded string for the obscured URL (e.g., Secure Hash Algorithm (SHA) 256 in this example), and template URL 72 defining a template into which the encoded string can be inserted to form the obscured URL. Because SHA256 is a one-way transformation, even if the secret string (key) is known, it is not possible to use the key to transform the obscured URL back into the initial URL. Other transformations can also be used, such as the md5 message-digest algorithm, other SHA algorithms, Cyclic Redundancy Check (CRC) 32, or other such transformations. In the example of FIG. 8, template URL 72 defines "/data/{hex:22}", specifying that a 22-character truncated string generated based on the SHA256 algorithm is inserted into the template to create the obscured URL. The string to be inserted into the template can be a truncated version of the actual result of the transformation, meaning that in some examples less than all of the bits of the encoded string can be used in the URL. In other examples, the entirety of the string generated by the transformation can be used.

As illustrated, secret data 62 can also include content encoding information 74 that defines how to encode document content or transactions to be sent to the remote resource. As illustrated, content encoding information can include key information 76, including secret string 78 to be used as an encryption key for encoding the content, as well as content encoding encryption algorithm 80 (AES192 in this example).

Figure 9:
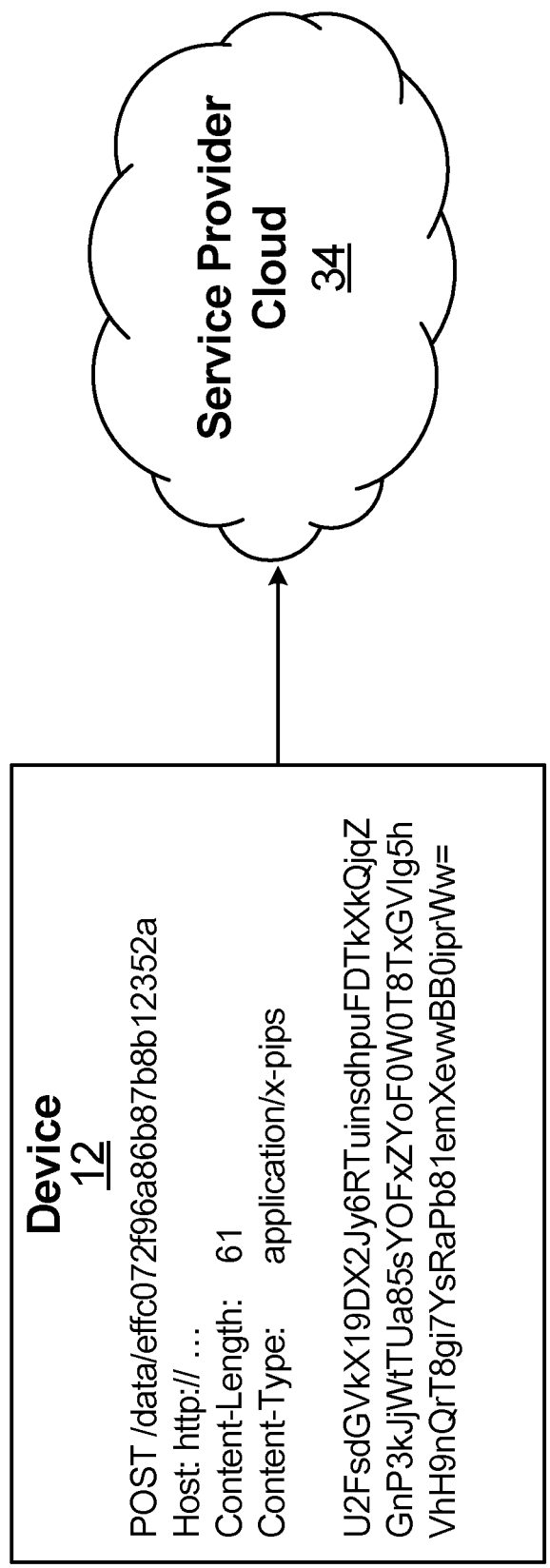
FIG. 9 is a block diagram illustrating an example of accessing the remote resource at an obscured URL generated using secret data.

FIG. 9 is a block diagram illustrating an example of accessing the remote resource at an obscured URL generated using secret data. As illustrated in FIG. 9, rather than posting unencrypted content to the initial URL (which may be an intuitive URL), data processing device 12 can post encrypted content to an obscured URL. In this way, both the content and the URL correspond to an unintuitive string of characters that does not reveal sensitive information.

Figure 10:
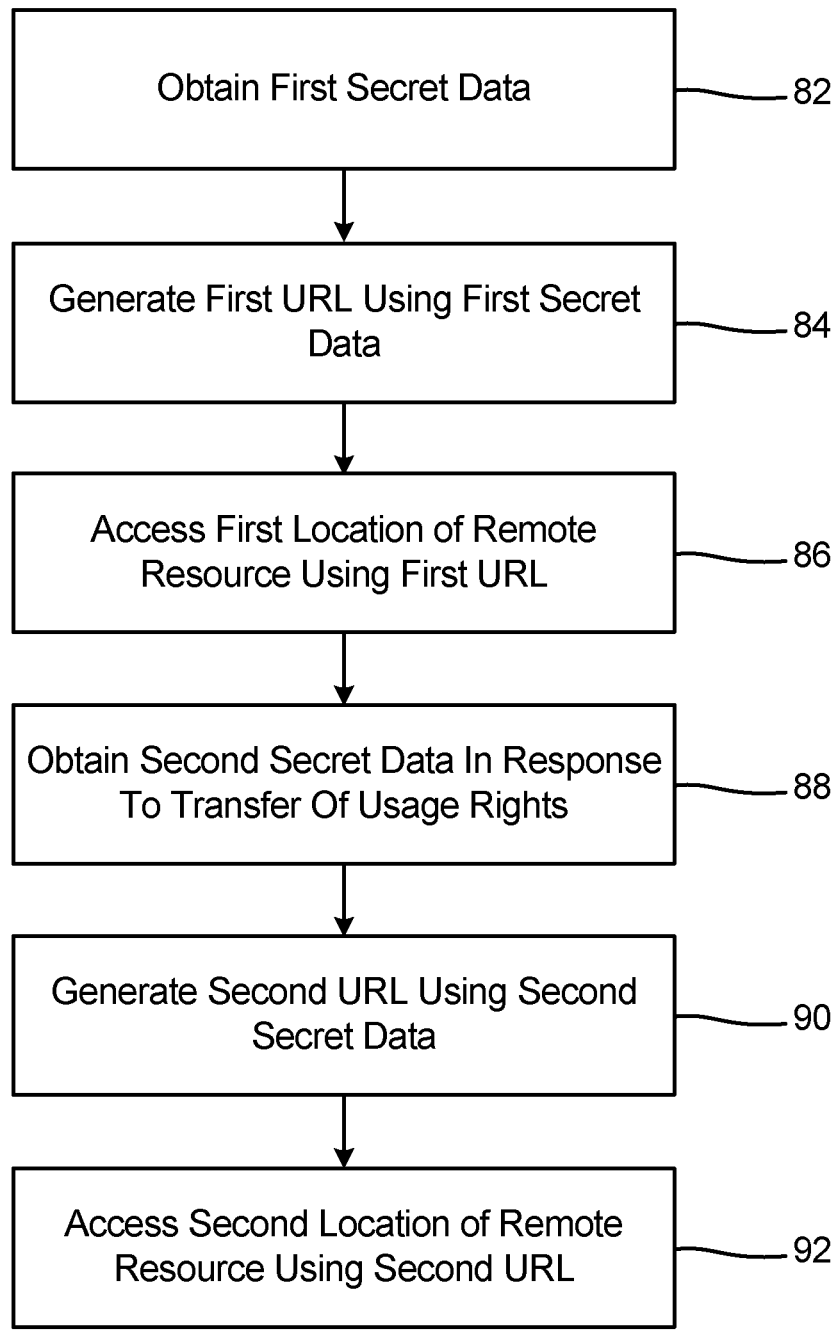
FIG. 10 is a flow diagram illustrating example operations for accessing data at a remote resource including a transfer of usage rights from a first user to a second user.

FIG. 10 is a flow diagram illustrating example operations for accessing data at a remote resource including a transfer of usage rights from a first user to a second user. The example operations of FIG. 10 are provided from the perspective of a data processing device that accesses a remote resource at, e.g., a cloud network. Example operations from the perspective of a remote resource (e.g., a server device) are provided below with respect to FIG. 11. For purposes of clarity and ease of discussion, the example operations are described below within the context of data processing system 10.

First secret data can be obtained (step 82). For example, data processing device 12 can receive secret data KU1 38 from service provider 16. KU1 38 can be associated with user 1, and can correspond to user 1 location 42 of service provider cloud 34. In some examples, data processing device 12 can verify the authenticity of the remote resource of service provider cloud 34 to validate secret data KU1 38.

Verifying the authenticity of the remote resource can include receiving a certificate chain from the remote resource, and verifying the authenticity via the received certificate chain, such as by using an encryption key. For example, data processing device 12 can validate the authenticity of the received certificate chain using public key 26. In certain examples, the remote resource of service provider cloud 34 can be considered a first remote resource, and receiving the certificate chain can include accessing a location of a second remote resource via an ownership URL. The location of the second remote resource can include data usable to obtain the location of the first remote resource at which the certificate chain is stored. For example, data processing device 12 can access a location of CoX cloud 22 specified by ownership URL 24 at which a command is stored to access an alternate ownership URL at a remote resource of service provider cloud 34.

A first URL can be generated using the first secret data (step 84). The first URL can be usable to obtain the first location of the remote resource. For example, data processing device 12 can generate an encrypted (e.g., obscured) URL, such as encrypted URL_K1, usable to obtain user 1 location 42 of remote resource 48 of service provider cloud 34. In some examples, an initial URL corresponding to the remote resource can be obtained, such as initial URL 58. In such examples, generating the first URL can include obscuring the initial URL using the first secret data, such as by applying a first transformation of the initial URL specified by the first secret data. In some examples, the first URL can specify the first location of the remote resource. In other examples, the first URL can identify a first key node location, such as key node 52, that includes data usable to obtain a first resource URL (e.g., resource URL 1) identifying the first location of the remote resource (e.g., user 1 location 42).

The first location of the remote resource can be accessed using the first URL (step 86). For example, data processing device 12 can access user 1 location 42 using encrypted URL_K1 (e.g., via resource URL 1). Second secret data associated with a second user can be obtained in response to a transfer of usage rights of the data processing device from the first user to the second user (step 88). The second secret data can be associated with the second user, and can correspond to a second location of the remote resource. For instance, data processing device 12 can obtain secret data KU2 44 from service provider cloud 34 in response to a transfer of usage rights of data processing device 12 from user 1 to user 2. Secret data KU2 44 can correspond to user 2 location 46 of remote resource 48 of service provider cloud 34. In some examples, obtaining the second secret data can include replacing the first secret data with the second secret data at computer-readable memory of the data processing device. For instance, data processing device 12 can replace, within computer-readable memory of data processing device 12, secret data KU1 38 with secret data KU2 44. In some examples, each of the first and second locations of the remote resource can include encrypted data. For instance, each of user 1 location 40 and user 2 location 46 can include encrypted data. In such examples, the first secret data (e.g., KU1 38) can include a first encryption key configured to decode the encrypted data at the first location of the remote resource, and the second secret data (e.g., KU2 44) can include a second encryption key configured to decode the encrypted data at the second location of the remote resource.

A second URL can be generated using the second secret data (step 90). The second URL can be usable to obtain the second location of the remote resource. For example, data processing device 12 can generate an encrypted (e.g., obscured) URL, such as encrypted URL_K2, usable to obtain user 2 location 46 of remote resource 48 of service provider cloud 34. The second location of the remote resource can be inaccessible via the first URL. The first location of the remote resource can be inaccessible via the second URL.

In some examples, generating the second URL can include obscuring the obtained initial URL using the second secret data, such as by applying a second transformation of the initial URL specified by the second secret data. Each of the first and second transformations can be, in certain examples, one-way transformations, such as the SHA256 transformation, such that the initial URL cannot be obtained from either the obscured first URL or the obscured second URL using either the first secret data or the second secret data. In some examples, the second URL can specify the second location of the remote resource. In other examples, the second URL can identify a second key node location, such as key node 54, that includes data usable to obtain a second resource URL (e.g., resource URL 2) identifying the second location of the remote resource (e.g., user 2 location 46). Generating the second URL can include refraining from generating the first URL in response to the transfer of usage rights of the data processing device from the first user to the second user.

The second location of the remote resource can be accessed using the second URL (step 92). For example, data processing device 12 can access user 2 location 46 using encrypted URL_K2 (e.g., via resource URL 2). In certain examples, the example operations can further include obtaining third secret data (e.g., secret data KO 36 associated with data processing device 12) corresponding to a third location of the remote resource (e.g., device location 40). In such examples, the data processing device can generate, using the third secret data, a third URL (e.g., encrypted URL_K0) usable to obtain the third location of the remote resource. The third location of the remote resource (e.g., device location 40) can be inaccessible via each of the first URL (e.g., encrypted URL_K1 and/or resource URL 1) and the second URL (e.g., encrypted URL_K2 and/or resource URL 2). Each of the first location (e.g., user 1 location 42) and the second location (e.g., user 2 location 46) can be inaccessible via the third URL (e.g., encrypted URL_KO and/or resource URL 0).

The data processing device can access the third location of the remote resource using the third URL. For instance, data processing device 12 can access device location 40 using encrypted URL_KO (e.g., via resource URL 0). Accessing the third location of the remote resource can include accessing the third location using the third URL before and after the transfer of usage rights of the data processing device from the first user to the second user.

Figure 11:
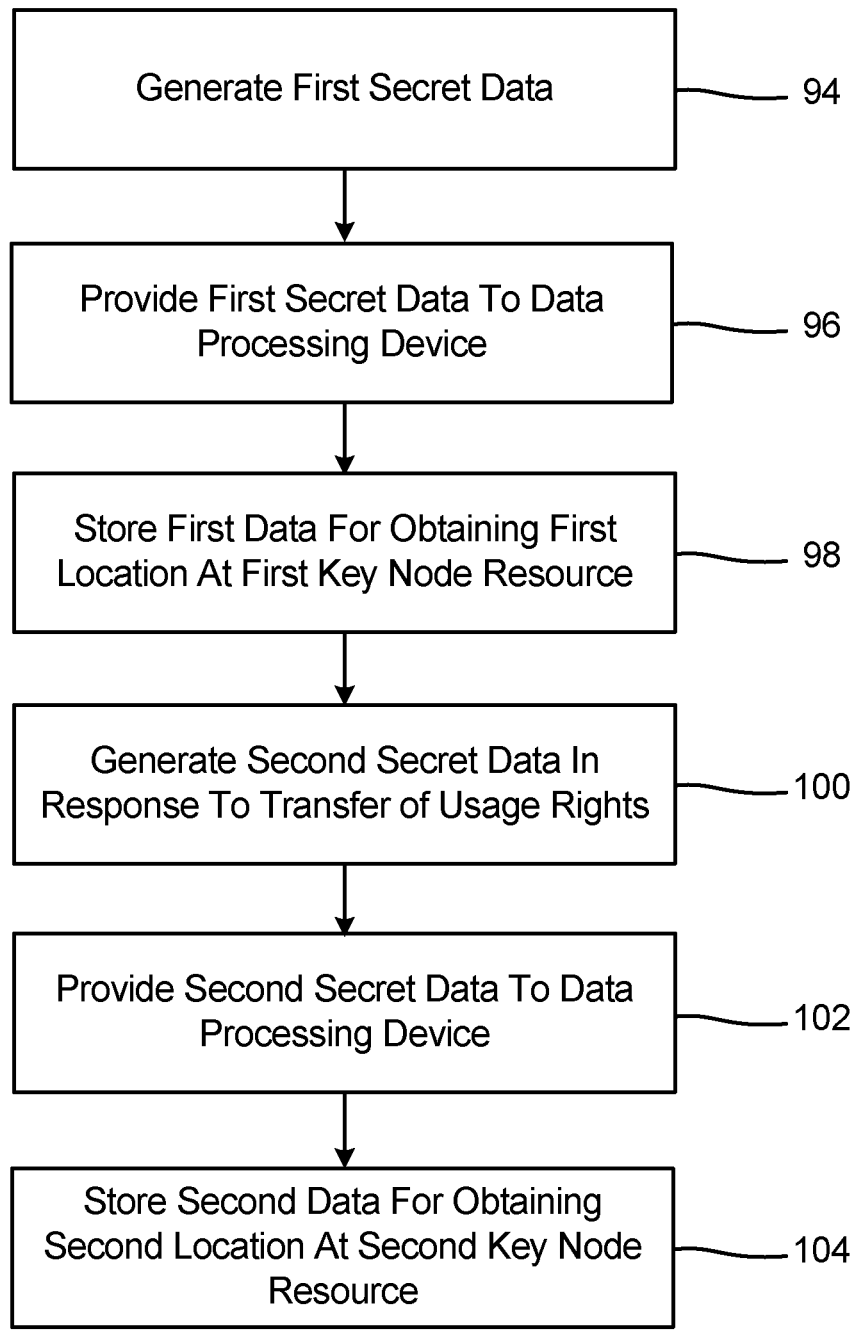
FIG. 11 is a flow diagram illustrating example operations for providing secret data to manage data access at a remote resource including a transfer of usage rights from a first user to a second user.

FIG. 11 is a flow diagram illustrating example operations for providing secret data to manage data access at a remote resource including a transfer of usage rights from a first user to a second user. The example operations described below are provided from the perspective of a remote resource that can interact with one or more data processing devices to manage data access at the remote resource. For purposes of clarity and ease of discussion, the example operations are described below within the context of data processing system 10.

First secret data can be generated (step 94). The first secret data can be associated with a first user and correspond to a first location of computer-readable memory of a server system having at least one computing device and computer-readable memory. For example, service provider cloud 34 including, e.g., a server system having at least one computing device and computer-readable memory, can generate secret data KU1 38 associated with user 1 and corresponding to user 1 location 42.

The first secret data can be provided to a data processing device (step 96). The first secret data can be for generating a first URL usable to obtain the first location of the computer-readable memory of the server system. For instance, service provider cloud 34 can transmit secret data KU1 38 to data processing device 12. The first secret data (e.g., KU1 38) can be usable to obtain user 1 location 42.

The first URL can identify a first key node resource location of the computer-readable memory of the server system. First data for obtaining the first location of the computer-readable memory of the server system can be stored at the first key node resource location (step 98). For example, service provider cloud 34 can store, at key node 52, data for obtaining resource URL 1 identifying user 1 location 42 of remote resource 48 of service provider cloud 34.

Second secret data can be generated in response to a transfer of usage rights of the data processing device from the first user to a second user (step 100). The second secret data can be associated with the second user and correspond to a second location of the computer-readable memory of the server system. For instance, service provider cloud 34 can generate secret data KU2 44 associated with user 2 and corresponding to user 2 location 46.

The second secret data can be provided to the data processing device (step 102). The second secret data can be for generating a second URL usable to obtain the second location of the computer-readable memory of the server system. The second location of the computer-readable memory of the server system can be inaccessible via the first URL. The first location of the computer-readable memory of the server system can be inaccessible via the second URL. For instance, service provider cloud 34 can transmit secret data KU2 44 to data processing device 12. The second secret data (e.g., KU2 44) can be usable to obtain user 2 location 46. The second URL can identify a second key node resource location of the computer-readable memory of the server system.

Second data for obtaining the second location of the computer-readable memory of the server system can be stored at the second key node resource location (step 104). For example, service provider cloud 34 can store, at key node 54, data for obtaining resource URL 2 identifying user 2 location 46 of remote resource 48 of service provider cloud 34.

Figure 12:
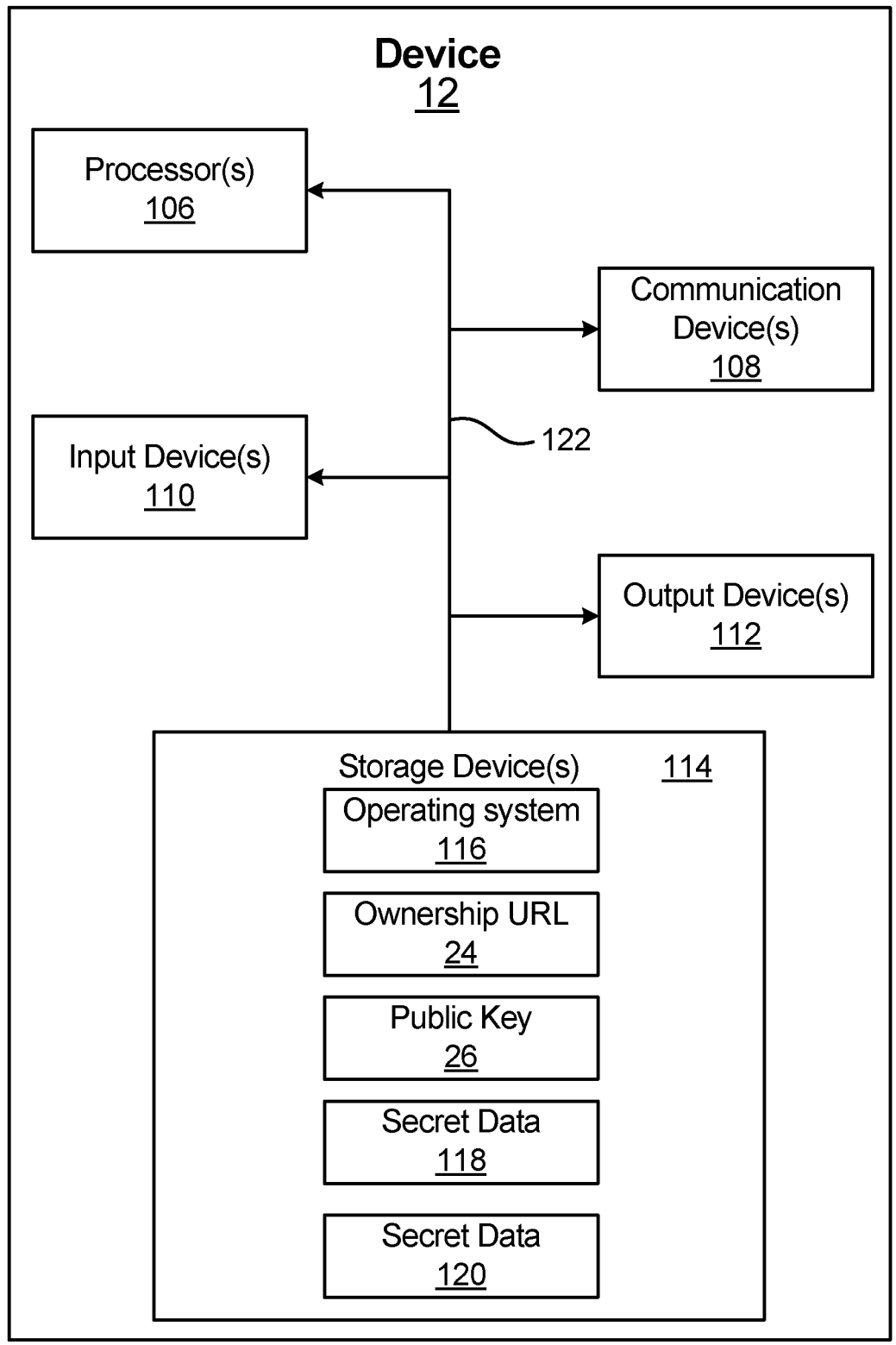
FIG. 12 is a block diagram illustrating an example data processing device that can access data at a remote resource.

FIG. 12 is a block diagram illustrating an example of data processing device 12 that can access data at a remote resource. FIG. 12 illustrates only one example of data processing device 12, and many other examples of data processing device 12 can be used in other examples.

As illustrated in FIG. 12, data processing device 12 can include one or more processors 106, one or more communication devices 108, one or more input devices 110, one or more output devices 112, and one or more storage devices 114. As illustrated, data processing device 12 can include (e.g., stored at storage device 114) operating system 116, ownership URL 24, public key 26, secret data 118, and secret data 120.

Each of components 106, 108, 110, 112, and 114 can be interconnected (physically, communicatively, and/or operatively) for inter-component communications, such as via communication channels 122. In some examples, communication channels 122 can include a system bus, a network connection, an inter-process communication data structure, or any other method for communicating data.

Processor 106, in one example, is configured to implement functionality and/or process instructions for execution within data processing device 12. For instance, processor 106 can be capable of processing instructions stored in storage device 114. Examples of processor 106 can include any one or more of a microprocessor, a controller, a digital signal processor (DSP), an application specific integrated circuit (ASIC), a field-programmable gate array (FPGA), or other equivalent discrete or integrated logic circuitry.

Storage device 114 can be configured to store information within data processing device 12 during operation. Storage device 114, in some examples, is described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device 114 is a temporary memory, meaning that a primary purpose of storage device 114 is not long-term storage. Storage device 114, in some examples, is described as a volatile memory, meaning that storage device 114 does not maintain stored contents when power to data processing device 12 is turned off. Examples of volatile memories can include random access memories (RAM), dynamic random access memories (DRAM), static random access memories (SRAM), and other forms of volatile memories. In some examples, storage device 114 is used to store program instructions for execution by processor 106. Storage device 114, in one example, is used by software or applications running on data processing device 12 to temporarily store information during program execution.

Storage device 114, in some examples, also includes one or more computer-readable storage media. Storage device 114 can be configured to store larger amounts of information than volatile memory. Storage device 114 can further be configured for long-term storage of information. In some examples, storage device 114 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

As illustrated in FIG. 12, data processing device 12 can also include communication device 108. Data processing device 12, in one example, utilizes communication device 108 to communicate with external devices via one or more networks, such as one or more wired or wireless networks, or both. Communication device 108 can be a network interface card, such as an Ethernet card, an optical transceiver, a radio frequency transceiver, or any other type of device that can send and receive information. Other examples of such network interfaces can include Bluetooth, 3G, 4G, and WiFi radio computing devices as well as Universal Serial Bus (USB).

Data processing device 12, in certain examples, also includes input device 110. Input device 110, in some examples, is configured to receive input from a user. Examples of input device 110 can include a mouse, a keyboard, a microphone, a camera device, a presence-sensitive and/or touch-sensitive display, or other type of device configured to receive input, such as from a user. In some examples, input device 110 can be and/or can receive input from one or more sensors, such as a temperature sensor, pressure sensor, proximity sensor, or other sensor.

Output device 112 can be configured to provide output, such as to a user. Examples of output device 112 can include a display device, a sound card, a video graphics card, a speaker, a cathode ray tube (CRT) monitor, a liquid crystal display (LCD), an organic light-emitting diode (OLED) display, or other type of device for outputting information in a form understandable to users or machines.

Data processing device 12 can include operating system 116. Operating system 116 can, in some examples, control the operation of components of data processing device 12. For example, operating system 116 can facilitate the communication of executing software or applications with processor 106, communication device 108, input device 110, output device 112, and storage device 114.

Storage device 114, as illustrated in FIG. 12, can store ownership URL 24, public key 26, secret data 118, and secret data 120. Secret data 118 and secret data 120 can include, for example, one or more of an encryption key and a URL transform for obtaining an encrypted (e.g., obscured) URL corresponding to a location of a remote resource. For instance, secret data 118 can store secret data KO 36, and secret data 120 can store secret data KU1 38. While illustrated with respect to two sets of secret data 118 and 120, in some examples, storage device 114 can store more or fewer than two sets of secret data. In certain examples, storage device 114 can remove and/or replace any one or more of secret data 118 and secret data 120 with different secret data. For instance, processor 106, executing computer-readable instructions stored at storage device 114 according to techniques described herein, can cause storage device 114 to overwrite the contents of secret data 120 to store KU2 44 rather than KU1 38. In this way, data processing device can effectively "forget" secret data KU1 38 associated with user 1 in response to, e.g., a transfer of ownership and/or usage rights of data processing device 12 from user 1 to user 2.

According to techniques of this disclosure, data processing system 10 can efficiently manage access (e.g., data read and/or write access) to a remote resource, such as a remote resource of service provider cloud 34, via control of knowledge of secret data corresponding to locations of the remote resource. The techniques can preserve privacy of data during transfers of ownership and/or usage rights of data processing device 12 between users. In addition, the techniques can enable shared use of a data processing device among users while maintaining privacy of data between the users.

Figure 13:
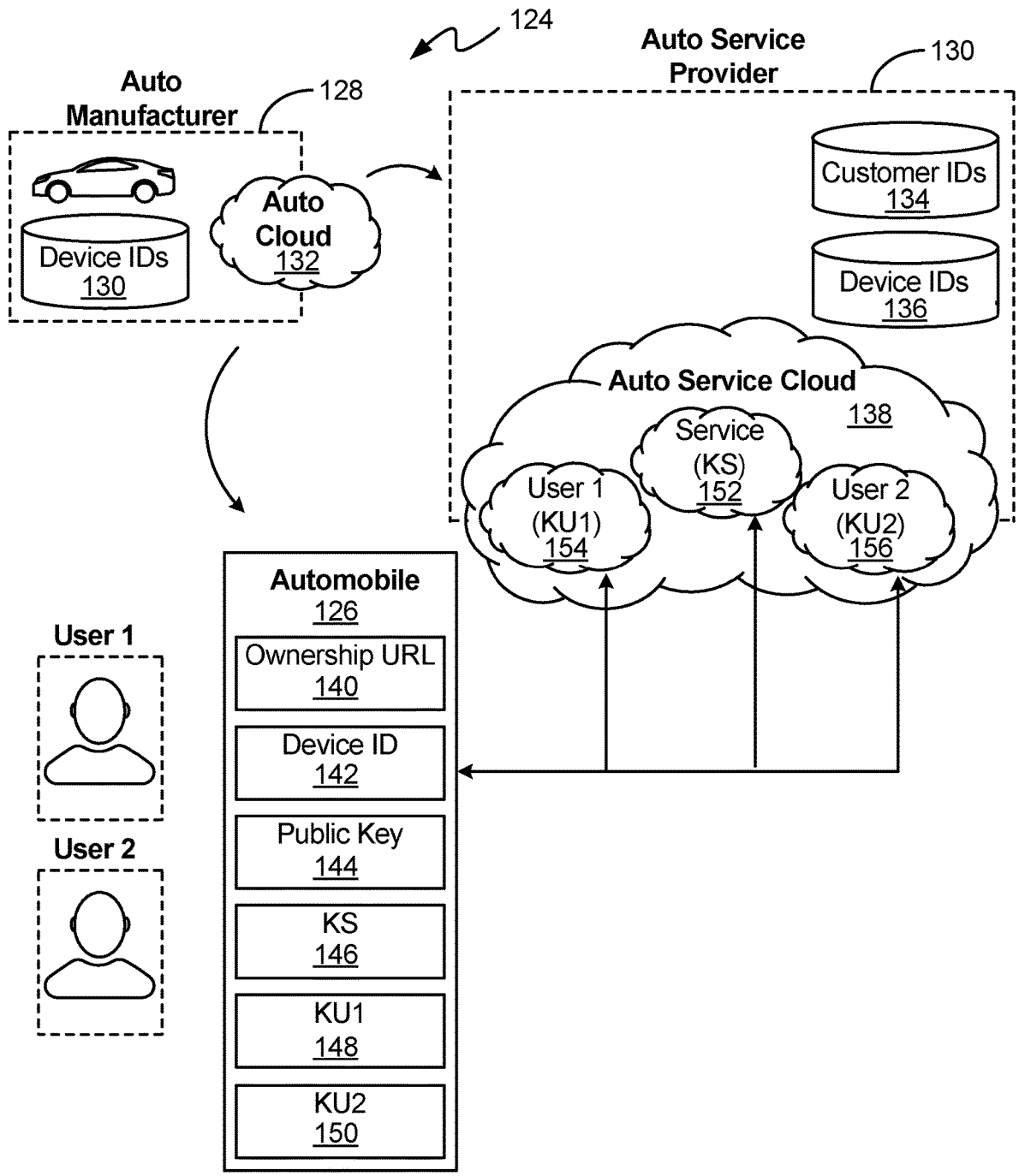
FIG. 13 is a block diagram illustrating an example data processing system that can be used to manage data access at a remote resource during shared use of a connected automobile.

FIG. 13 is block diagram illustrating an example of data processing system 124 that can manage data access at a remote resource during shared use (e.g., among users) of connected automobile 126. That is, FIG. 13 illustrates an additional example of a data processing system that can manage data access of a data processing device. In this example, automobile 126 (e.g., a car, truck, bus, or other such automobile) can be considered a "connected" automobile, in that automobile 126 can include one or more data processing devices having processing and communications circuitry for sending and receiving data with a remote resource, such as a remote resource included in, e.g., a cloud network. While the example of FIG. 13 is described herein with respect to a connected automobile, it should be understood that the techniques are applicable to many other example products and/or devices. In general, the techniques are applicable to any product or device that is configured to connect to a network service, such as a cloud network, to send and receive data that can be categorized as associated with multiple users and/or entities. In addition, while the example of FIG. 13 is described with respect to the shared use of automobile 126 by user 1 and user 2, it should be understood that the techniques can enable shared use by more than two users, as well as the transfer of ownership and/or usage rights between any of the multiple users and/or entities associated with ownership or use of automobile 126.

As illustrated in FIG. 13, data processing system 124 can include auto manufacturer 128 and auto service provider 130. In general, data processing system 124 can be similar in nature to data processing system 10 described above, in that data processing system 124 can manage data access at a remote resource during shared use and/or transfer of ownership or usage rights of automobile 126. In the example of FIG. 13, auto manufacturer 128 manufactures automobile 126 and maintains device IDs (e.g., a database) storing unique identifiers of the manufactured automobiles within, e.g., auto cloud 132.

Auto service provider 130 can be a maintenance or other service entity associated with automobile 126. Auto service provider 130, as illustrated, includes customer IDs 134 and device IDs 136. Each of customer IDs 134 and device IDs 136 can be a database for storing and retrieving information, such as unique identifiers of automobiles and associated customers. Auto service cloud 138 can be any interconnected network of computing devices, such as server devices, mainframe computers, or other such computing devices.

Automobile 126, as illustrated, can include ownership URL 140, device ID 142, public key 144, service key (KS) 146, user 1 key (KU1 148), and user 2 key (KU2 150). Device ID 142 can be any unique identifier of automobile 126, such as a vehicle identification number (VIN) or other such identifier. Auto manufacturer 128 can pre-provision automobile 126 with ownership URL 140 and public key 144, such as by storing ownership URL 140 and public key 144 in computer-readable memory of automobile 126. Public key 144 can be a public encryption key usable to encrypt data and/or verify a digital signature, such as a digital signature included with a certificate chain of authenticity for communications between devices of data processing system 124. Ownership URL 140 can identify a location of, e.g., auto cloud 132, that automobile 126 can access to obtain ownership or trusted communications information. For instance, automobile 126 can access the location of auto cloud 132 specified by ownership URL 140 at which a command is located, signed by auto manufacturer 128 using public key 144, to access a remote location (e.g., identified by a URL) of auto service cloud 138. Auto service provider 130 can store, at the remote location identified by the command, a digital certificate signed by auto service provider 130 using public key 144 received from auto cloud 132, e.g., upon transfer of ownership (or possession) of automobile 126 to user 1 and/or user 2.

Automobile 126 can receive KS 146, KU1 148, and KU2 150 from the remote resource of auto service cloud 138. For example, auto service provider 130 can determine, based on associations of data included in customer IDs 134 and device IDs 136, that both user 1 and user 2 are associated with automobile 126, and can transmit the appropriate keys via a command signed using public key 144. Each of KS 146, KU1 148, and KU2 150 can include an encryption key and a URL transform for obtaining one or more locations of a remote resource of auto service cloud 138. As such, each of KS 146, KU1 148, and KU2 150 can be considered secret data corresponding to locations of a remote resource, as is similarly described with respect to the above examples.

Automobile 126 can utilize secret data KS 146 (e.g., associated with auto service provider 130) to access service location 152 of service cloud 138. Similarly, automobile 126 can utilize secret data KU1 148 (e.g., associated with user 1) for access to user 1 location 154, and can utilize secret data KU2 150 (e.g., associated with user 2) for access to user 2 location 156. As an example, secret data KS 146 can include a first URL transformation that enables automobile 126 to transform an initial (e.g., intuitive) URL to obtain a first obscured (e.g., encrypted) URL corresponding to service location 152. Secret data KU1 148 can include a second URL transformation that enables automobile 126 to transform the initial URL to obtain a second obscured URL corresponding to user 1 location 154. Secret data KU2 150 can include a third URL transformation that enables automobile 126 to transform the initial URL to obtain a third obscured URL corresponding to user 2 location 156.

Service location 152 can be inaccessible via the second and third obscured URLs associated with secret data KU1 148 and secret data KU2 150, respectively. Similarly, user 1 location 154 can be inaccessible via the first and third obscured URLs associated with secret data KS 146 and secret data KU2 150, and user 2 location 156 can be inaccessible via the first and second obscured URLs associated with secret data KS 146 and secret data KU1 148. As such, access to data at each of locations 152, 154, and 156 can be managed by knowledge of secret data KS 146, KU1 148, and KU2 150, respectively. In this way, data processing system 124 can enable independent access to data associated with each of entities user 1, user 2, and auto service provider 130, without enabling cross-access to data between the entities.

In operation, automobile 126 can access data at service location 152, user 1 location 154, and user 2 location 156 based on a category of data to be accessed at each location. For instance, automobile 126 can access data (e.g., read and/or write data) at service location 152 that is categorized as pertinent to auto service provider 130, such as performance information of automobile 126, e.g., engine oil temperature, mileage, fuel economy information, or other such information. Automobile 126 can access data at user 1 location 154 that is associated with user 1, such as location information (e.g., previous travel locations, maps, or other location information), entertainment system preferences (e.g., preprogrammed radio stations, etc.), or other information associated with user 1. Similarly, automobile 126 can access data at user 2 location 156 that is associated with user 2, such as location information, climate control preferences, or other information corresponding to use of automobile 126 by user 2. Accordingly, because each of locations 152, 154, and 156 is inaccessible without knowledge of the corresponding secret data used to access the respective location, data corresponding to user 1 can be inaccessible to user 2, and data corresponding to user 2 can be inaccessible to user 1. In addition, data corresponding to either of user 1 and user 2 can be inaccessible to auto service provider 16, thereby maintaining privacy of data between users and entities.

In operation, access by automobile 126 to either of user 1 location 154 or user 2 location 156 (e.g., utilization of either secret data KU1 148 or KU2 150) can be determined based on, e.g., proximity of a device (e.g., smartphone, smartwatch, or other electronic device) associated with either of user 1 or user 2 to automobile 126, such as via Bluetooth pairing or other proximity information. In some examples, access to either of user 1 location 154 or user 2 location 156 can be determined based on proximity or utilization of a key to automobile 126 (i.e., a physical key used for operation of automobile 126, such as for engine ignition). For instance, a first physical key can correspond to user 1, and a second physical key can correspond to user 2. Automobile 126 can utilize secret data KU1 148 to access user 1 location 154 in response to determining that the first physical key corresponding to user 1 is proximate (or is used for operation of) automobile 126, but can utilize secret data KU2 150 to access user 2 location 156 in response to determining that the second physical key is proximate (or used for operation of) automobile 126.

In this way, techniques described herein can enable access to data and associated privacy rights between shared users of automobile 126 through the utilization of secret data corresponding to a location of the remote resource associated with the respective secret data. While the example of FIG. 13 has been described with respect to shared use of automobile 126 (e.g., multiple authorized users and multiple stored secret data), the techniques are also applicable to a transfer of ownership and/or usage rights between users. For instance, as described in the examples above with respect to data processing device 12 (e.g., a health monitoring device), ownership and/or usage rights can be transferred from, e.g., user 1 and/or user 2 to a third user. In such an example, auto service cloud 138 can cause automobile 126 to rotate (e.g., overwrite or otherwise delete) user keys associated with previous users 1 and 2 (e.g., KU1 148 and KU2 150) with new secret data associated with a different location of auto service cloud 138. In this way, the techniques can enable user 1 and user 2 to maintain access to user 1 location 154 and user 2 location 156, respectively, while ensuring that neither user 1 nor user 2 can access the location associated with the third user (and vice versa). Moreover, through the continued use of secret data 146, the techniques can enable auto service provider 130 to have continued access to service location 152 and the associated data that can be pertinent to maintenance of automobile 126 without enabling auto service provider 130 to access any of the user data.

Techniques described herein can enable enhanced security and privacy of data between users (or other entities) of networked devices, such as IoT devices, through the controlled knowledge of secret data corresponding to locations of a remote resource. The techniques can enable efficient management of data access before, during, and after a transfer of ownership and/or usage rights of the networked device, thereby enhancing usability and maintainability of the network of devices. As such, techniques described herein improve not only security and privacy of data, but the efficiency of administering such privacy rules.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   obtaining, by a data processing device comprising processing circuitry and computer-readable memory, first secret data associated with a first location of a remote resource and second secret data associated with a second location of the remote resource, the first secret data including a first uniform resource locator (URL) transformation and the second secret data including a second URL transformation;
   generating, by the data processing device using the first URL transformation, a first obscured URL to enable access to the first location; and
   generating, by the data processing device using the second URL transformation, a second obscured URL to enable access to the second location, wherein the first obscured URL is different than the second obscured URL,
   wherein the first location and the second location are accessed based on a category of data to be accessed.

2. The method of claim 1,
   wherein generating the first obscured URL using the first URL transformation comprises applying the first URL transformation to an initial URL to generate the first obscured URL; and
   wherein generating the second obscured URL using the second URL transformation comprises applying the second URL transformation to the initial URL to generate the second obscured URL.

3. The method of claim 2,
   wherein each of the first location and the second location of the remote resource are inaccessible via the initial URL.

4. The method of claim 1,
   wherein the first secret data comprises user-specific secret data;
   wherein the first location of the remote resource stores data corresponding to a user associated with the user-specific secret data;
   wherein the second secret data comprises device-specific secret data associated with the data processing device; and
   wherein the second location of the remote resource stores data corresponding to the data processing device.

5. The method of claim 1,
   wherein the first secret data further includes first URL encoding information;
   wherein the second secret data further includes second URL encoding information;
   wherein generating the first obscured URL further comprises applying the first URL encoding information to generate the first obscured URL; and
   wherein generating the second obscured URL further comprises applying the second URL encoding information to generate the second obscured URL.

6. The method of claim 1,
   wherein each of the first location and the second location of the remote resource store encrypted data;
   wherein the first secret data comprises a first encryption key configured to decode the encrypted data at the first location of the remote resource; and
   wherein the second secret data comprises a second encryption key configured to decode the encrypted data at the second location of the remote resource.

7. The method of claim 1,
   wherein obtaining the first secret data and the second secret data comprises obtaining the first secret data and the second secret data from the remote resource.

8. The method of claim 1, further comprising:
   accessing, by the data processing device using the first secret data, the first location of the remote resource; and
   accessing, by the data processing device using the second secret data, the second location of the remote resource.

9. A data processing device comprising:
processing circuitry; and
computer-readable memory encoded with instructions that, when executed by the processing circuitry, cause the data processing device to:
  generate a first obscured uniform resource location (URL) using a first URL transformation included in first secret data associated with a first location of a remote resource to enable access to the first location; and
  generate a second obscured URL using a second URL transformation included in second secret data associated with a second location of the remote resource to enable access to the second location,
  wherein the first obscured URL is different than the second obscured URL, and wherein the first location and the second location are accessed based on a category of data to be accessed.

10. The data processing device of claim 9, further comprising:
communication circuitry;
wherein the data processing device is configured to receive the first secret data and the second secret data via the communication circuitry.

11. The data processing device of claim 9,
wherein the computer-readable memory is further encoded with instructions that, when executed by the processing circuitry, cause the data processing device to:
  generate the first obscured URL using the first URL transformation by applying the first URL transformation to an initial URL to generate the first obscured URL; and
  generate the second obscured URL using the second URL transformation by applying the second URL transformation to the initial URL to generate the second obscured URL.

12. The data processing device of claim 11,
wherein each of the first location and the second location of the remote resource are inaccessible via the initial URL.

13. The data processing device of claim 9,
wherein the first secret data comprises user-specific secret data;
wherein the first location of the remote resource stores data corresponding to a user associated with the user-specific secret data;
wherein the second secret data comprises device-specific secret data associated with the data processing device; and
wherein the second location of the remote resource stores data corresponding to the data processing device.

14. The data processing device of claim 9,
wherein the first secret data further includes first URL encoding information;
wherein the second secret data further includes second URL encoding information; and
wherein the computer-readable memory is further encoded with instructions that, when executed by the processing circuitry, cause the data processing device to:
  generate the first obscured URL by applying the first URL encoding information to generate the first obscured URL; and
  generate the second obscured URL by applying the second URL encoding information to generate the second obscured URL.

15. The data processing device of claim 9,
wherein each of the first location and the second location of the remote resource store encrypted data;
wherein the first secret data comprises a first encryption key configured to decode the encrypted data at the first location of the remote resource; and
wherein the second secret data comprises a second encryption key configured to decode the encrypted data at the second location of the remote resource.

16. A system comprising:
a server system comprising at least one remote resource, the at least one remote resource including:
  a first location accessible using a first uniform resource locator (URL); and
  a second location accessible using a second URL;
a first data processing device comprising:
  processing circuitry;
  communications circuitry; and
  computer-readable memory that stores:
    an initial URL;
    first secret data including a first URL transformation;
    second secret data including a second URL transformation; and
    instructions that, when executed by the processing circuitry, cause the first data processing device to:
      apply the first URL transformation of the first secret data to the initial URL to generate the first URL to access the first location;
      apply the second URL transformation of the second secret data to the initial URL to generate a second URL to access the second location; and
      wherein the first location of the at least one remote resource is inaccessible via the second URL, wherein the second location of the at least one remote resource is inaccessible via the first URL, and wherein the first location and the second location are accessed based on a category of data to be accessed.

17. The system of claim 16,
wherein the at least one remote resource comprises a first remote resource and a second remote resource;
wherein the first location of the at least one remote resource is a first location of the first remote resource; and
wherein the second location of the at least one remote resource is a second location of the second remote resource.

18. The system of claim 16, further comprising:
a second data processing device comprising:
  second processing circuitry;
  second communications circuitry; and
  second computer-readable memory that stores:
    the initial URL;
    the first secret data including the first URL transformation; and
    instructions that, when executed by the processing circuitry, cause the second data processing device to:
      apply the first URL transformation of the first secret data to the initial URL to generate the first URL.

* * * * *